US012728069B1

(12) United States Patent
Lai

(10) Patent No.: US 12,728,069 B1
(45) Date of Patent: Sep. 8, 2026

(54) MASSAGE DEVICE AND MASSAGE WAND

(71) Applicant: LONGNAN PINXIN MOTOR CO., LTD., Longnan (CN)

(72) Inventor: Guanxi Lai, Ganzhou (CN)

(73) Assignee: Longnan Pinxin Motor Co., Ltd., Longnan (CN)

( * ) Notice: Subject to any disclaimer, the term of this patent is extended or adjusted under 35 U.S.C. 154(b) by 0 days.

(21) Appl. No.: 19/365,244

(22) Filed: Oct. 22, 2025

(30) Foreign Application Priority Data

Mar. 7, 2025 (CN) ......................... 202520396064.1
Aug. 25, 2025 (CN) ......................... 202521813673.9

(51) Int. Cl.
*A61H 19/00* (2006.01)
*A61H 23/00* (2006.01)
*A61H 23/02* (2006.01)

(52) U.S. Cl.
CPC ........... *A61H 19/44* (2013.01); *A61H 23/006* (2013.01); *A61H 23/0254* (2013.01); *A61H 2201/0169* (2013.01); *A61H 2201/0192* (2013.01); *A61H 2201/1215* (2013.01); *A61H 2201/149* (2013.01); *A61H 2201/1669* (2013.01); *A61H 2201/1695* (2013.01)

(58) Field of Classification Search
CPC .. A61H 19/44; A61H 23/006; A61H 23/0254; A61H 2201/0169; A61H 2201/0192; A61H 2201/1215; A61H 2201/149; A61H 2201/1669; A61H 2201/1695
USPC ............................................................ 600/38
See application file for complete search history.

(56) References Cited

U.S. PATENT DOCUMENTS 9,066,843 B1 * 6/2015 Greco .................... A61H 21/00
2009/0069730 A1 * 3/2009 Knyrim ............. A61H 23/0263 601/134
2009/0198158 A1 * 8/2009 Nan .................. A61H 23/0254 601/87
2010/0130897 A1 * 5/2010 Knyrim ................. A61H 19/44 601/89
2017/0020775 A1 * 1/2017 Rydel ..................... A61H 19/44
(Continued)

FOREIGN PATENT DOCUMENTS

CN 118078604 A 5/2024
DE 102022106346 B4 10/2023

*Primary Examiner* — Brian L Casler
(74) *Attorney, Agent, or Firm* — Ming Jiang; OPENPTO US LLC

(57) ABSTRACT

A massage device and a massage wand are provided. The massage device includes a drive motor, slider keel units, and a rotating shaft, where each of the slider keel units is provided with a first engaging portion, a supporting portion, and a rotation constraint portion. The rotating shaft is composed of a plurality of shaft units arranged along a rotation axis of the drive motor, and each of the shaft units is provided with a second engaging portion deviating from the axis. The rotation constraint portion is configured to constrain the slider keel unit. The supporting portion provides external support. The drive motor is connected to the rotating shaft and configured to drive the second engaging portion of the shaft unit. The first engaging portion and the second engaging portion are in coupled interlock. The massage device provided has better reliability and longer service life.

20 Claims, 26 Drawing Sheets

(56) References Cited

U.S. PATENT DOCUMENTS

| | | | | |
|---|---|---|---|---|
| 2024/0099929 | A1 | 3/2024 | Qian | |
| 2025/0213423 | A1 * | 7/2025 | Weekly .................. | A61H 19/34 |

* cited by examiner

MASSAGE DEVICE AND MASSAGE WAND

CROSS-REFERENCE OF RELATED APPLICATION

The present application claims priorities of Chinese Patent Application No. 2025203960641 filed on Mar. 7, 2025 and Chinese Patent Application No. 2025218136739 filed on Aug. 25, 2025, which are incorporated herein by reference in their entireties.

TECHNICAL FIELD

The present disclosure relates to the technical field of adult toys, and in particular to a massage device and a massage wand.

BACKGROUND

In today's fast-paced life, people pay increasing attention to health preservation. Massage, as an effective way to relieve fatigue, promote blood circulation, and alleviate muscle tension, has gained wide popularity. Against this backdrop, automated massage devices have emerged, providing people with convenient massage services.

The core of a traditional massage device lies in converting a rotational motion of a drive motor into a linear reciprocating motion of a massage head. A most common transmission mechanism for achieving this function includes an eccentric shaft and sliders, that is, eccentric portions deviating from a shaft core are arranged on a rotating shaft, and the eccentric portion extends into a guide hole of the slider to drive the slider to perform a linear reciprocating motion through rotation. However, this traditional transmission structure has inherent limitations: According to a traditional solution, an integrally processed eccentric long shaft is usually adopted to drive all the sliders, and when this eccentric long shaft rotates at high speed, the dynamic balance problem is very prominent. Centrifugal forces generated by a plurality of the eccentric portions superimpose each other, which causes significant flexural deformation and vibration of the entire shaft, not only produces huge noise, but also accelerates the wear of bearings and the shaft, thereby seriously affecting the service life, reliability, and user experience (noise and hand feeling) of the massage device. To solve the vibration problem, it is usually necessary to add a complex counterweight mechanism or use a thicker and heavier shaft, which runs counter to the goals of designing lightweight and compact devices.

SUMMARY

In view of the above problems, an objective of the present disclosure is to provide a massage device with better reliability and longer service life, so as to solve the above problems.

The present disclosure is achieved by means of the following technical solution:

In a first aspect, the massage device includes a drive motor, slider keel units, and a rotating shaft, where each of the slider keel units is provided with a first engaging portion, a supporting portion, and a rotation constraint portion. The rotating shaft is composed of a plurality of shaft units arranged along a rotation axis L1 of the drive motor, and each of the shaft units is provided with a second engaging portion deviating from the axis L1. The rotation constraint portion is configured to constrain the slider keel unit such that the slider keel unit only has a freedom A of a linear reciprocating motion, where a direction of the freedom A is perpendicular to the axis L1. The supporting portion is configured to provide external support such that the massage device presents a specified shape. The drive motor is connected to the rotating shaft and configured to drive the second engaging portion of the shaft unit to perform a rotational motion around the axis L1 with a non-zero radius. The first engaging portion and the second engaging portion are in coupled interlock, such that a rotational motion of the second engaging portion is converted into a linear reciprocating motion of the slider keel unit along the freedom A.

According to the technical solutions in the embodiments of the present disclosure, a symmetric eccentric design is adopted for the second engaging portion of each of the shaft units (for example, eccentric directions of some of the shaft units are opposite), and centrifugal forces generated during rotation thereof may counteract each other, which resolves a dynamic balance problem caused by superposition of centrifugal forces of a traditional long shaft, and significantly reduces a vibration amplitude; reduction of the vibration amplitude directly results in noise reduction during the operation of the massage device, prevents harsh abnormal noise caused by a violent vibration, and enhances the user experience; a diminished vibration reduces the frictional wear between the first engaging portion and the second engaging portion, improves the stability, and prolongs a trouble-free operation duration of the massage device as compared with a traditional device; and additional configuration of a balance counterweight is not required, and each of the shaft units may have a small-diameter structure (with a diameter smaller than that of the traditional long shaft), such that an overall weight of the massage device is reduced, which better meets lightweight requirements for massage devices.

In some embodiments, the massage device further includes a guide member; a length direction of the guide member is parallel to the axis L1; the guide member is provided with a guide groove; and the rotation constraint portion is in sliding fit with the guide groove such that the slider keel unit is restricted to only have the freedom A of the linear reciprocating motion.

According to the technical solutions in the embodiments of the present disclosure, the guide groove of the guide member precisely constrains a motion direction of the slider keel unit, which enhances the stability of slider motion, and reduces the vibration amplitude; and stable sliding fit between the guide groove and the rotation constraint portion reduces the frictional collision between the first engaging portion and the second engaging portion, and reduces a wear rate, thereby prolonging the service life of the massage device.

In some embodiments, the slider keel unit has two limit positions when performing the linear reciprocating motion along the freedom A; and one of the limit positions is located within a contour range of the guide member, and the other limit position at least partially extends beyond the contour range of the guide member.

According to the technical solutions in the embodiments of the present disclosure, when the second engaging portion drives the slider keel unit to move, movement of only the supporting portion of the slider keel unit that extends beyond the contour range of the guide member pushes an external contour of the massage device to change, which ensures that a protrusion is formed only at a target massage area covered by the external contour of the massage device, such that a precise massage effect on the massage area is achieved.

In some embodiments, the first engaging portion is a cylindrical hole provided with a cylindrical guiding surface; the second engaging portion is a cylinder; during coupling and interlocking, the cylinder moves and presses the cylindrical guiding surface, such that the slider keel unit passively performs the linear reciprocating motion within the freedom A; or, the first engaging portion is a cylinder; the second engaging portion is a cylindrical hole provided with a cylindrical guiding surface; and during coupling and interlocking, the cylindrical guiding surface moves and presses the cylinder, such that the slider keel unit passively performs the linear reciprocating motion within the freedom A.

According to the technical solutions in the embodiments of the present disclosure, the cylindrical guiding surface has a guiding function, which further limits a relative displacement between the first engaging portion and the second engaging portion, and in combination with limiting by the rotation constraint portion, a reciprocating motion trajectory deviation of the slider keel unit is small; a relative motion between the cylinder and the cylindrical guiding surface is a uniform circumferential friction, which prevents localized excessive wear caused by an asymmetric structure, and the service life of a fitting surface is longer than that of a traditional irregular fitting structure; and a cylindrical structure of clearance fit allows for a higher tolerance for the processing and assembly accuracy, and even if there exists a slight dimensional deviation, stable contact between the cylinder and the cylindrical guiding surface is still maintained, thereby reducing a defect rate during production.

In some embodiments, the cylinder is provided with a sleeve and a shaft core; and the sleeve is movably sleeved on an outer side of the shaft core, and the sleeve includes at least one surface area parallel to the axis L1, such that the first engaging portion and the second engaging portion are in surface contact when coupled with each other.

According to the technical solutions in the embodiments of the present disclosure, a thrust direction of the first engaging portion relative to the second engaging portion is consistent with a movement direction of the slider keel unit, without lateral component loss, and the thrust acts entirely in the movement direction, which improves force transmission efficiency, and increases a massage intensity under the same motor power; no additional friction is caused by a lateral force, a wear rate of the fitting surface is reduced, and the service life of the massage device is prolonged; and a stable thrust direction causes a small motion trajectory deviation of the slider keel unit, which drives to uniformly increase a pressing force applied by the massage sleeve to the massage area, and prevents the problem of local excessive pressing or missed pressing.

In some embodiments, each of the shaft units further includes a connecting portion; a length direction of the connecting portion is perpendicular to the axis L1; and the adjacent cylinders are connected through the connecting portion, and two opposite surfaces of the slider keel unit in a direction of the axis L1 are respectively fitted with the two adjacent connecting portions for limiting.

In some embodiments, a cross-section of the cylindrical hole is waist-shaped.

According to the technical solutions in the embodiments of the present disclosure, the length direction of the waist-shaped cylindrical guiding surface is perpendicular to the freedom A, which rigidly limits a component of the thrust perpendicular to the movement direction, ensures a small deviation in the thrust direction, and prevents lateral displacement of the slider keel unit during the motion; and the waist-shaped cylindrical guiding surface offers clear guiding constraints, and in combination with limiting by the rotation constraint portion, trajectory stability of the slider keel unit during the reciprocating motion is enhanced, without deflection or jittering.

In some embodiments, in a direction perpendicular to the freedom A, a cross-sectional width of a central area of the cylindrical hole is smaller than a cross-sectional width of two end areas.

According to the technical solutions in the embodiments of the present disclosure, when the cylinder slides from the auxiliary pushing segment to the main pushing segment, since the cross-sectional width of the central area is smaller than the cross-sectional width of two end areas, the slider keel unit suddenly moves forward for a certain distance from an original position in a forward direction, such that the user feels a sharp rise in a massage intensity, thereby providing a jumping-style massage experience.

In some embodiments, the cross-section of the cylindrical hole is a smoothly transitioned figure-of-eight shape.

According to the technical solutions in the embodiments of the present disclosure, when the cylinder abuts against the auxiliary pushing segment after rotating from a starting point, a moving distance of the slider keel unit of the figure-of-eight-shaped cylindrical hole in the direction of the freedom A is smaller than that of the slider keel unit of the waist-shaped cylindrical hole, and in this case, a motion speed is relatively gentle, thereby achieving a relatively gentle transition for massage; and when the cylinder slides from the auxiliary pushing segment to the main pushing segment, the moving distance of the slider keel unit of the figure-of-eight-shaped cylindrical hole is significantly larger than that of the slider keel unit of the waist-shaped cylindrical hole. Under the premise that a rotational speed of the rotating shaft is constant, a motion speed of the slider keel unit at the stage where the cylinder slides from the auxiliary pushing segment to the main pushing segment is significantly faster than that at the stage where the cylinder abuts against the auxiliary pushing segment, which forms a motion characteristic of sudden acceleration when approaching an endpoint, and achieves precise speed switching from gentle to fast; and the sudden acceleration when the cylinder enters the main pushing segment results in that a pressing force of the massage sleeve pushed by the slider keel unit on muscles increases instantly, which presents a jumping-style massage experience of gentle transition and sudden intensity increase, and enhances the layering and stimulation of massage.

In some embodiments, the cross-section of the cylindrical hole is of a smoothly transitioned toothed shape.

In some embodiments, the plurality of the slider keel units are divided into multiple groups; and the multiple groups of the slider keel units are arranged along the axis L1 in a staggered manner.

According to the technical solutions in the embodiments of the present disclosure, a staggered layout along the axis L1 eliminates massage blind spots arranged in a traditional manner, which increases an effective coverage length, and meets massage needs for large-area muscle groups; in an alternate rhythm, multiple groups of the slider keel units form a cycle of pressing-relaxing-repressing, which simulates the alternate force application with human hands; in a synchronous rhythm, a concentrated and strong pressing effect may be achieved, and the two rhythms prevent muscle adaptation fatigue caused by single continuous pressing, and enhance the comfort and diversity of massage; and the staggered arrangement results in dispersed distribution of massage forces in the direction of the axis L1, and in the alternate or synchronous rhythm, an average pressure exerted on muscles per unit area of the massage area is more balanced, which reduces the discomfort caused by local excessive pressing and ensures the overall massage intensity.

In some embodiments, the slider keel units are divided into two groups; projection points X1 of the second engaging portions of the shaft units on a plane perpendicular to the axis L1 are all located on a same circumference with a projection point X0 of the axis L1 on the plane as a circle center; and an included angle between two lines formed by connecting projection points of the second engaging portions of the adjacent shaft units with the projection point of the axis L1 is 180°, such that the two groups of the slider keel units are driven by the adjacent shaft units to move in opposite directions along the freedom A.

According to the technical solutions in the embodiments of the present disclosure, the eccentric directions of the second engaging portions of adjacent shaft units are opposite, and centrifugal forces generated during rotation counteract each other, such that an overall radial vibration amplitude of the massage device is reduced and operation stability is enhanced; and when an overall dimension of the massage device expands in the direction of the freedom A to massage a hole-shaped massage area, a relatively strong pressing massage effect is achieved.

In some embodiments, the supporting portion has a convex arc-shaped structure.

According to the technical solutions in the embodiments of the present disclosure, the convex arc-shaped structure of the supporting portion fits a physiological curve of the massage area, a contact area is significantly increased, and when the overall dimension of the massage device expands to increase the pressure exerted on the massage area, pressure dispersion prevents local compression on the massage area.

In some embodiments, the slider keel units are divided into four groups; where the first group of the slider keel units and the third group of the slider keel units only have the freedom A of the linear reciprocating motion; the second group of the slider keel units and the fourth group of the slider keel units only have a freedom B perpendicular to the freedom A and the axis L1; projection points X2 of the second engaging portions of the shaft units on a plane perpendicular to the axis L1 are all located on a same circumference with a projection point X0 of the axis L1 on the plane as a circle center; and an included angle between two lines formed by connecting projection points of the second engaging portions of the adjacent shaft units with the projection point of the axis L1 is 90°, such that the first group of the slider keel units and the third group of the slider keel units move in opposite directions within the freedom A, and additionally, the second group of the slider keel units and the fourth group of the slider keel units move in opposite directions within the freedom B.

According to the technical solutions in the embodiments of the present disclosure, the reverse motion in the directions of the freedom A (such as a longitudinal direction) and the freedom B (such as a transverse direction) is achieved simultaneously, and a massage trajectory evolves from massage in a single direction to three-dimensional cross pressing massage, which improves the muscle relaxation effect; and when an overall dimension of the massage device expands in the directions of the freedom A and the freedom B (i.e., four mutually perpendicular directions) to massage a hole-shaped massage area, a relatively strong pressing massage effect is achieved.

In some embodiments, supporting members are further included; each group of the slider keel units includes a plurality of the slider keel units; a plurality of the slider keel units in the same group are connected to the same supporting member; and a surface of the supporting member away from the slider keel unit is an arc surface and is configured to provide external support, such that the massage device presents a specified shape.

According to the technical solutions in the embodiments of the present disclosure, the supporting member has an arc surface for supporting the massage sleeve to form a specified shape, and the supporting portion pushes the massage sleeve to deform through the supporting member, which prevents generation of noticeable depressions at positions between the adjacent slider keel units in the same group corresponding to the massage sleeve due to a large spacing between the adjacent slider keel units in the same group.

In some embodiments, the arc surface of the supporting member configured to provide external support is further provided with a plurality of protrusions configured to enhance the massage effect.

In some embodiments, the slider keel units are divided into five groups; and motion freedom directions of the five groups of the slider keel units are radially distributed in the plane perpendicular to the axis L1, and an included angle between any two freedom directions is non-zero. Projection points X3 of the second engaging portions of the shaft units on a plane perpendicular to the axis L1 are all located on a same circumference with a projection point X0 of the axis L1 on the plane as a circle center; and an included angle between two lines formed by connecting projection points of the second engaging portions of the adjacent shaft units with the projection point of the axis L1 is 72°, such that the five groups of the slider keel units are driven by the rotating shaft to perform synchronous reciprocating motions in their respective freedom directions in the plane perpendicular to the axis L1.

According to the technical solutions in the embodiments of the present disclosure, five freedom directions distributed radially, in combination with a plurality of the slider keel units in each group, form a composite force field of directional zoning and dense coverage, and muscles per unit area of the massage area may receive alternating forces in multiple directions and multiple contact points, which improves the effect of relieving muscle tension; and when an overall dimension of the massage device expands in the directions of five non-overlapping freedoms to massage a hole-shaped massage area, a relatively strong pressing massage effect is achieved.

In a second aspect, the present disclosure provides a massage wand, including a drive motor, an elastic massage sleeve, slider keel units, and a rotating shaft, where each of the slider keel units is provided with a first engaging portion, a supporting portion, and a rotation constraint portion; the rotating shaft is provided with a plurality of second engaging portions, and each of the second engaging portions deviates from a rotation axis L1 of the drive motor; the rotation constraint portion is configured to constrain the slider keel unit such that the slider keel unit only has a freedom A of a linear reciprocating motion, where a direction of the freedom A is perpendicular to the axis L1; the drive motor is connected to the rotating shaft and configured to drive the second engaging portion to perform a rotational motion around the axis L1 with a non-zero radius; the first engaging portion and the second engaging portion are in coupled interlock, such that a rotational motion of the second engaging portion is converted into a linear reciprocating motion of the slider keel unit along the freedom A; a plurality of the slider keel units are arranged along the axis L1, and orthographic projections of the adjacent units in the direction of the axis L1 do not overlap with each other; and the supporting portion is configured to provide external support, and the supporting portions of the plurality of the slider keel units jointly support the massage sleeve to present a specified shape.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

Figure 1:
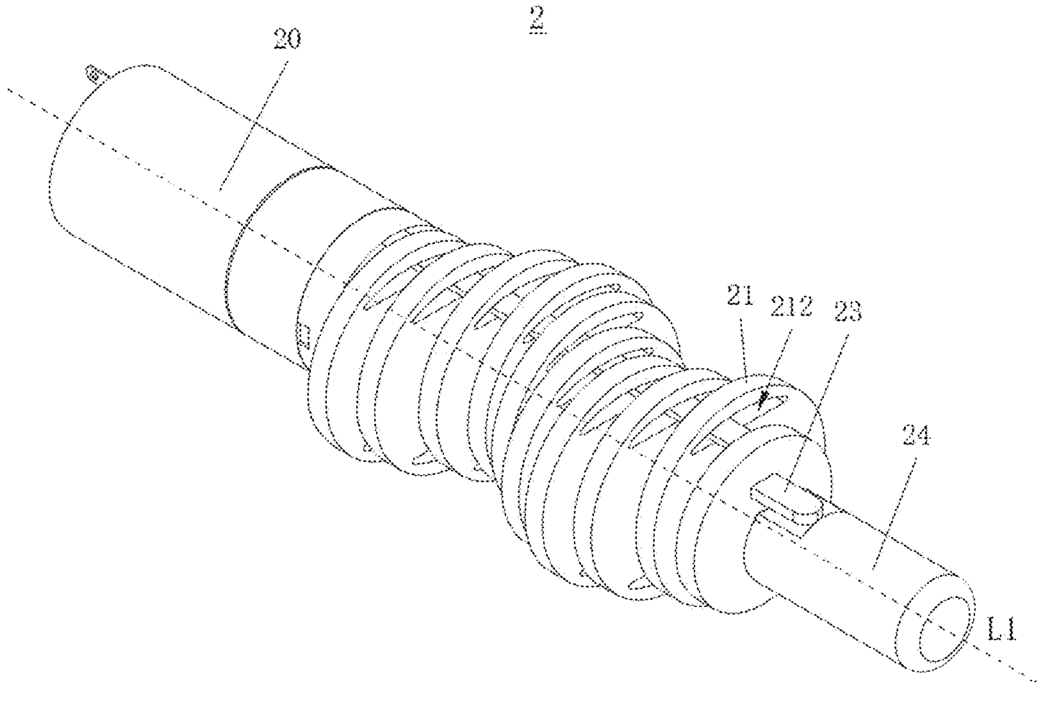
FIG. 1 is a schematic structural diagram of a massage device provided in some embodiments of the present disclosure.
Figure 2:
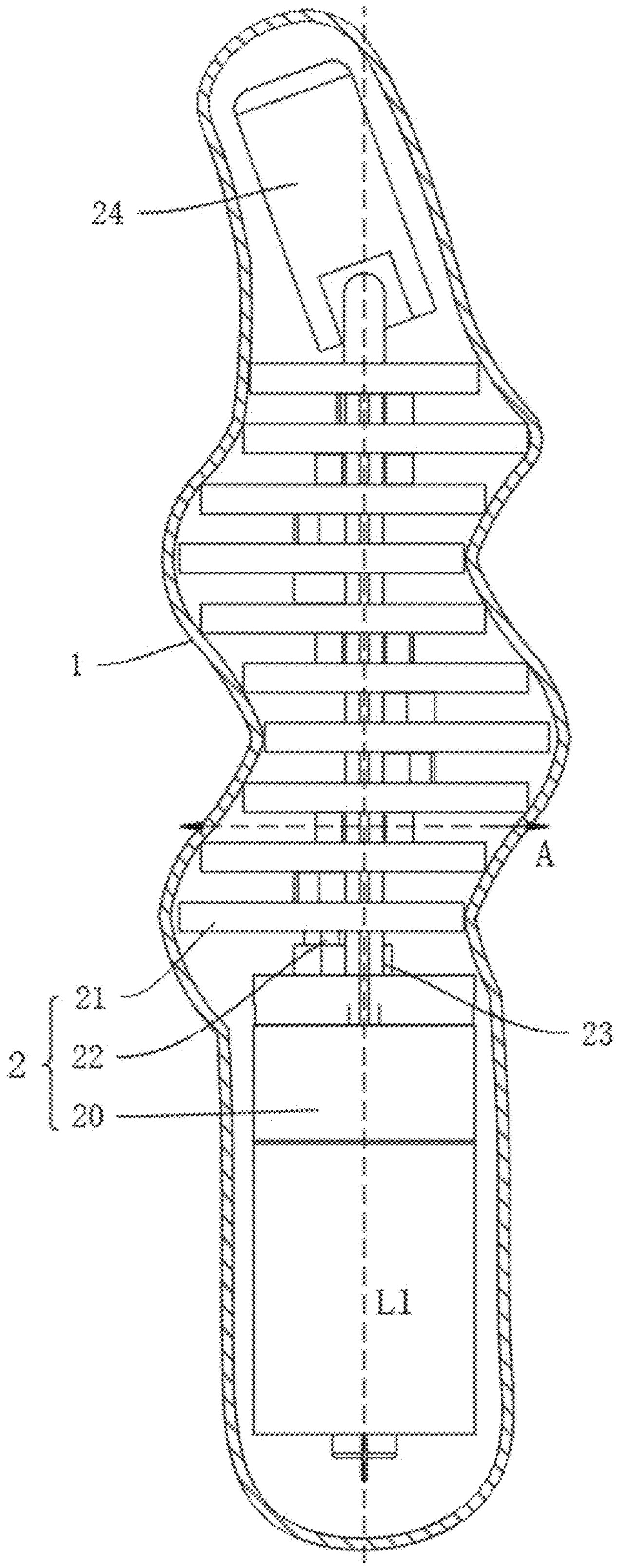
FIG. 2 is a sectional view of a massage device and a massage sleeve provided in some embodiments of the present disclosure.
Figure 3:
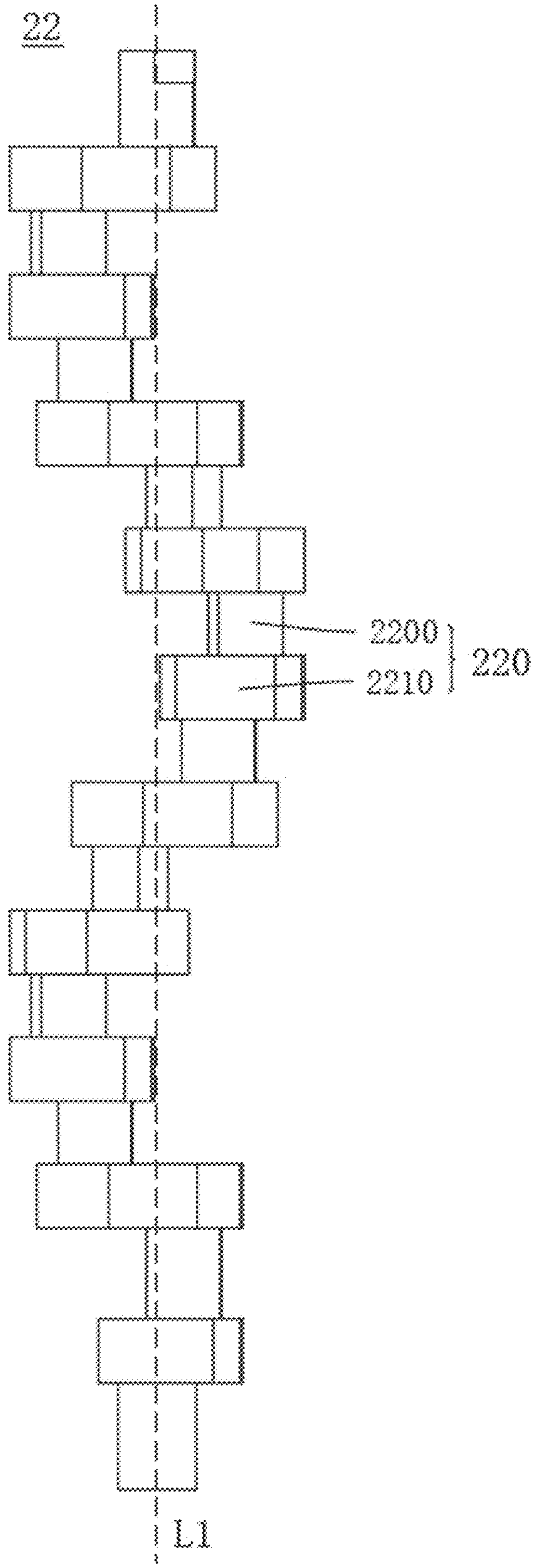
FIG. 3 is a side view of a rotating shaft provided in some embodiments of the present disclosure.
Figure 4:
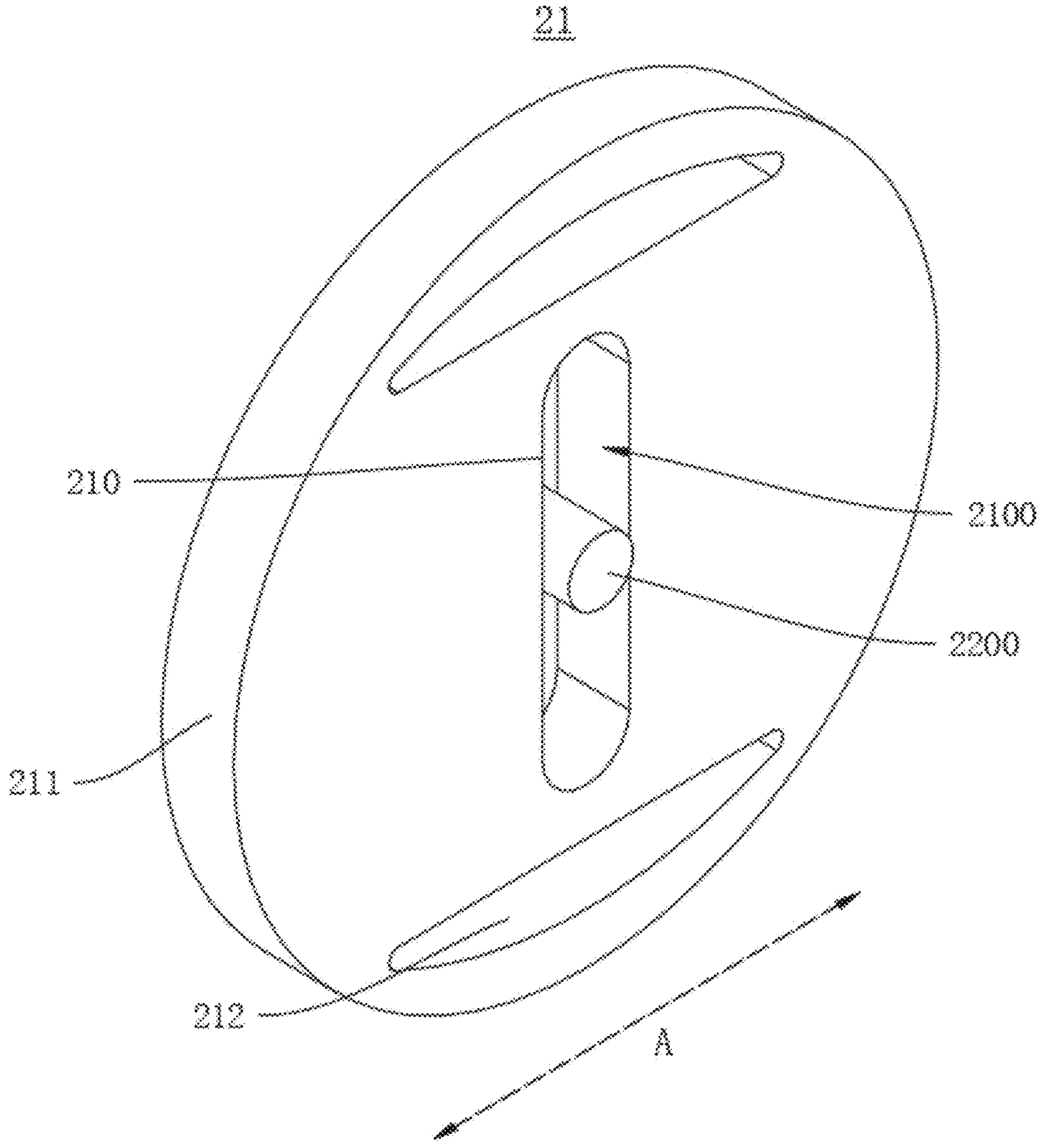
FIG. 4 is a schematic structural diagram of a slider keel unit provided in some embodiments of the present disclosure.

Reference numerals in the figures: 1—massage sleeve; 10—massage cavity; 2—massage device; 20—drive motor; 21—slider keel unit; 210—first engaging portion; 2100—cylindrical guiding surface; 21000—main pushing segment; 21001—auxiliary pushing segment; 211—supporting portion; 212—rotation constraint portion; 213—guide portion; 22—rotating shaft; 220—shaft unit; 2200—second engaging portion; 22000—sleeve; 22001—shaft core; 2210—connecting portion; 23—guide shaft; 24—massage head portion; 25—supporting member; 26—guide member; and 260—guide groove.

DETAILED DESCRIPTION OF PREFERRED EMBODIMENTS

In order to make the objectives, technical solutions and advantages of the embodiments of the present disclosure clearer, the technical solutions in the embodiments of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific embodiments merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the embodiments described herein can be combined with other embodiments.

In the description of the present disclosure, it is to be noted that, unless otherwise explicitly specified and defined, the terms "mounting", "connected", "connecting" and "attaching" are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term "and/or" in the present disclosure, which is merely an association relation describing an associated object, means that there maybe exist three relations, for example, A and/or B maybe represent three situations: A exists alone, A and B exist at the same time, and B exists alone. In addition, the character "/" mentioned in the present disclosure generally indicates that the associated objects are in an "or" relationship.

The term "a plurality of" used in the present disclosure refers to two or more (including two), and similarly, "a plurality of groups" refers to two or more groups (including two groups), and "a plurality of sheets" refers to two or more sheets (including two sheets).

According to some embodiments of the present disclosure, optionally, as shown in FIGS. 1 to 4, the present disclosure provides a massage device 2, and the massage device 2 includes a drive motor 20, slider keel units 21, and a rotating shaft 22, where each of the slider keel units 21 is provided with a first engaging portion 210, a supporting portion 211, and a rotation constraint portion 212; the rotating shaft 22 is composed of a plurality of shaft units 220 arranged along a rotation axis L1 of the drive motor 20, and each of the shaft units 220 is provided with a second engaging portion 2200 deviating from the axis L1; where the rotation constraint portion 212 is configured to constrain the slider keel unit 21 such that the slider keel unit 21 only has a freedom A of a linear reciprocating motion; a direction of the freedom A is perpendicular to the axis L1; the supporting portion 211 is configured to provide external support such that the massage device 2 presents a specified shape; where the drive motor 20 is connected to the rotating shaft 22 and configured to drive the second engaging portion 2200 of the shaft unit 220 to perform a rotational motion around the axis L1 with a non-zero radius; and the first engaging portion 210 and the second engaging portion 2200 are interlocked in a coupled manner, such that a rotational motion of the second engaging portion 2200 is converted into a linear reciprocating motion of the slider keel unit 21 along the freedom A.

When in use, the massage device 2 provided by the present disclosure is placed in an elastic massage sleeve 1, and the slider keel unit 21 supports the massage sleeve 1 through the supporting portion 211; and the rotating shaft 22 pushes the slider keel unit 21 to perform the linear reciprocating motion along the freedom A through the coupling and interlocking between the second engaging portion 2200 and the first engaging portion 210 so as to push the massage sleeve 1 to deform, and the massage sleeve 1 deforms to press or squeeze a user's massage area to produce a massage effect.

Figure 5:
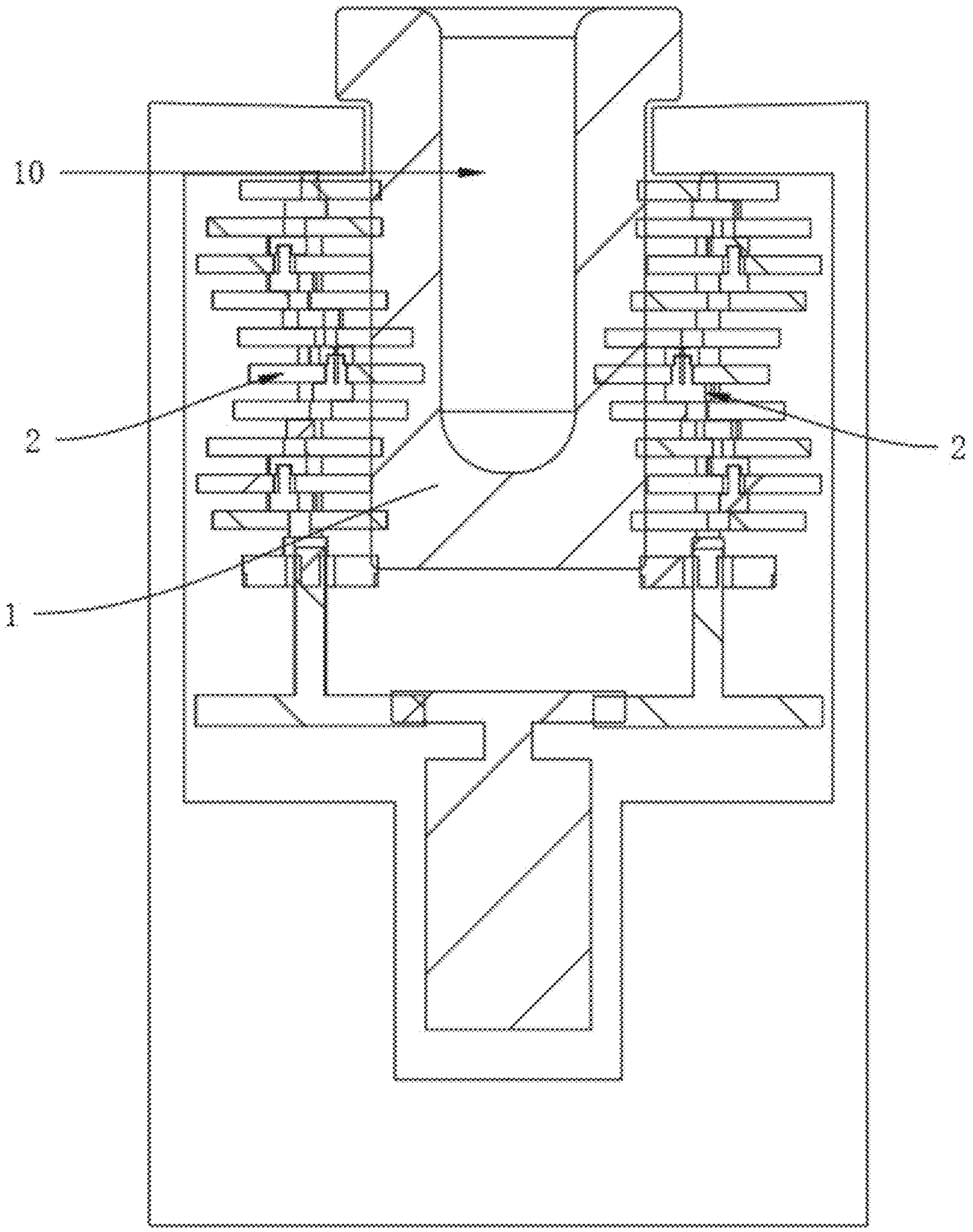
FIG. 5 is a sectional view of a massage device and a massage sleeve provided in some other embodiments of the present disclosure.

The massage device 2 provided by the present disclosure may extend into a relatively narrow and long massage area and push the external massage sleeve 1 to deform to press an inner wall of the massage area so as to achieve a massage effect; and alternatively, as shown in FIG. 5, a massage cavity 10 for the user's massage area to extend into may be formed at a center of the massage sleeve 1, a plurality of the massage devices 2 are arranged around the massage cavity 10, and the plurality of the massage devices 2 push an inner wall of the massage cavity 10 to deform to wrap and press the user's massage area.

During use, a plurality of the slider keel units 21 may be arranged, and movement of the plurality of the slider keel units 21 supports the massage sleeve 1 to form shapes of bending, peristalsis, and intermittent arching to implement massage actions.

A material of the massage sleeve 1 may include, but is not limited to, silicone, polyurethane, and the like.

When a plurality of the slider keel units 21 are arranged, the plurality of the shaft units 220 are in one-to-one correspondence with the plurality of the slider keel units 21.

The "coupling and interlocking" mentioned in the present disclosure refers to a dynamic connection and force transmission relationship formed by structural cooperation between the first engaging portion 210 and the second engaging portion 2200, a core function thereof is to convert the rotational motion of the second engaging portion 2200 into a linear reciprocating motion of the first engaging portion 210 (and the slider keel unit 21), and a semi-rigid connection between the first engaging portion 210 and the second engaging portion 2200 is established through a specific geometric shape design to ensure that the two engaging portions always maintain contact and controllable relative positions during a motion process.

When the user activates the massage device 2, the drive motor 20 powers on and drives the rotating shaft 22 to rotate around the axis L1, and in this case, the second engaging portion 2200 of each of the shaft units 220 rotates around the axis L1 with a non-zero radius synchronously with the shaft unit 220. Since the first engaging portion 210 and the second engaging portion 2200 are in coupled interlock, and the slider keel unit 21, due to restriction by the rotation constraint portion 212, only performs the linear reciprocating motion in a direction of the freedom A perpendicular to the axis L1 (i.e., a direction of pressing the massage area), and the rotational motion of the second engaging portion 2200 is converted into a linear driving force of the first engaging portion 210 through coupling, which finally drives the entire slider keel unit 21 to perform a back-and-forth reciprocating motion along a slide rail, such that a massage head on the supporting portion 211 applies a periodic pressing force to the massage area accordingly.

A symmetric eccentric design is adopted for the second engaging portion 2200 of each of the shaft units 220 (for example, eccentric directions of some of the shaft units 220 are opposite), and centrifugal forces generated during rotation thereof may counteract each other, which resolves a dynamic balance problem caused by superposition of centrifugal forces of a traditional long shaft, and significantly reduces a vibration amplitude; reduction of the vibration amplitude directly results in noise reduction during the operation of the massage device, prevents harsh abnormal noise caused by a violent vibration, and enhances the user experience; a diminished vibration reduces the frictional wear between the first engaging portion 210 and the second engaging portion 2200, improves the stability, and prolongs a trouble-free operation duration of the massage device as compared with a traditional device; and additional configuration of a balance counterweight is not required, and each of the shaft units 220 may have a small-diameter structure (with a diameter smaller than that of the traditional long shaft), such that an overall weight of the massage device is reduced, which better meets lightweight requirements for massage devices.

Figure 6:
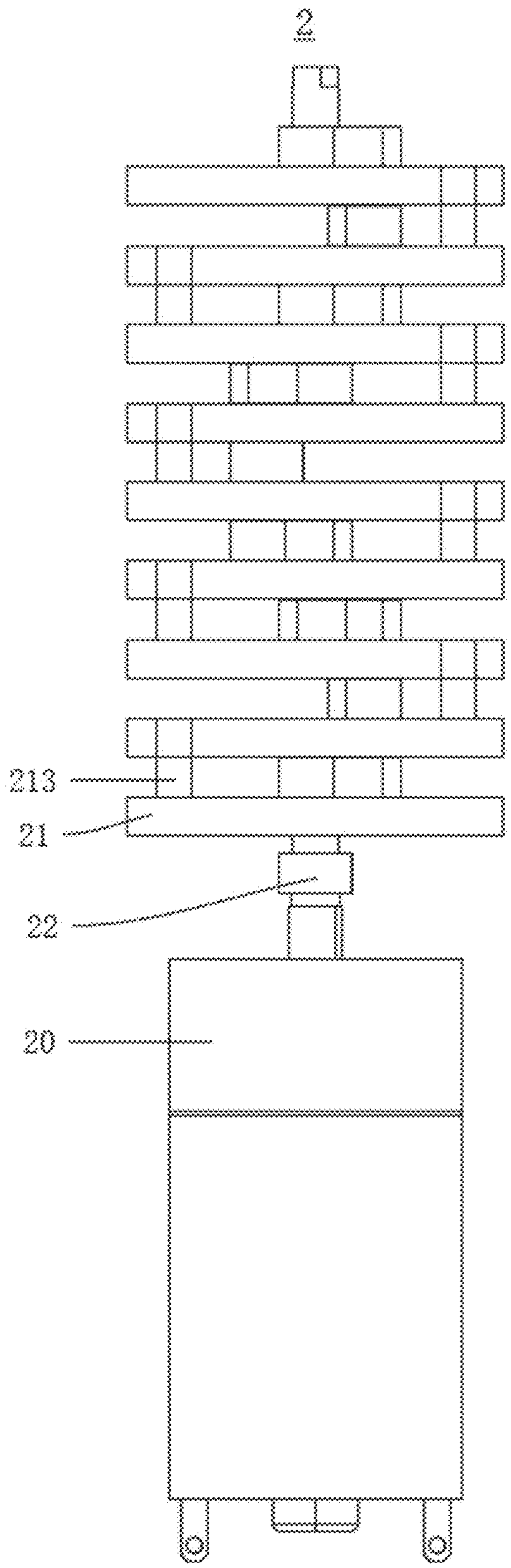
FIG. 6 is a side view of a rotating shaft provided in some other embodiments of the present disclosure.
Figure 7:
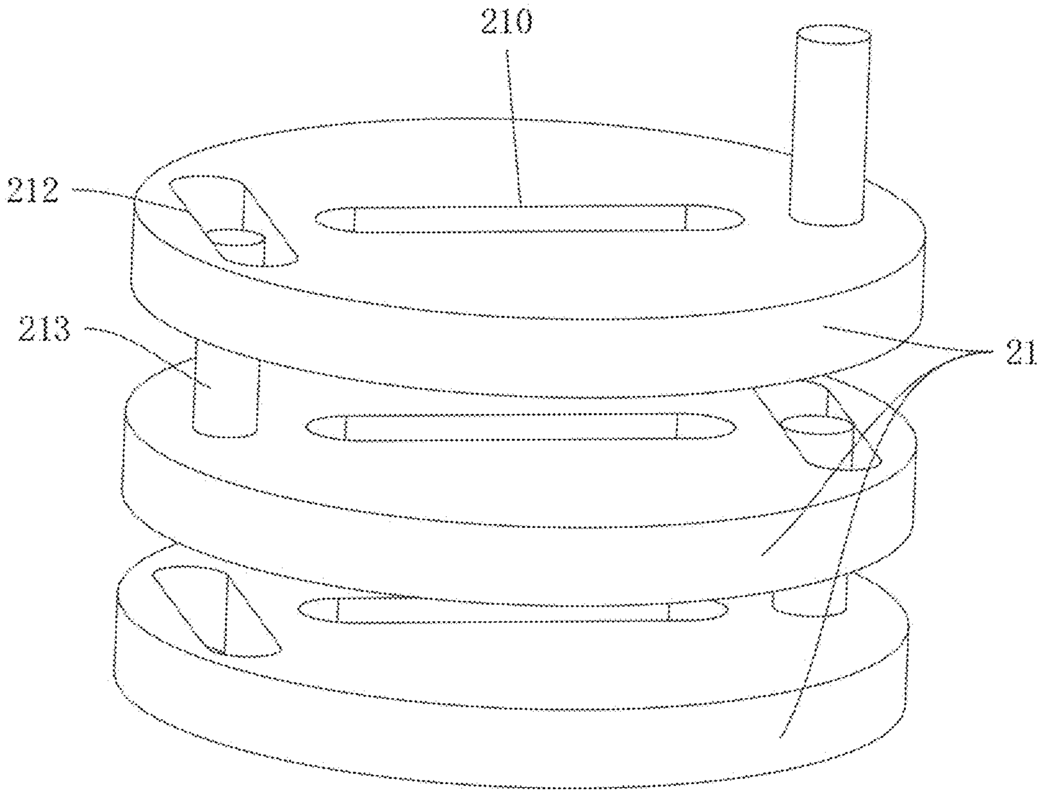
FIG. 7 is a schematic structural diagram of a slider keel unit provided with a guide portion provided in some embodiments of the present disclosure.

In a specific implementation process, the rotation constraint portion 212 on the slider keel unit 21 may be a guide hole, and the massage device 2 further includes a guide shaft 23 adapted to the guide hole, where cooperation between the guide hole and the guide shaft 23 causes the slider keel unit 21 to only have the freedom A of the linear reciprocating motion; or, as shown in FIGS. 6 and 7, the rotation constraint portion 212 on the slider keel unit 21 may be a guide hole, and the slider keel unit 21 is further provided with a guide portion 213 protruding along the axis L1, where the guide portion 213 may extend into the guide hole of the adjacent slider keel unit 21, and the cooperation between the guide hole and the guide portion 213 causes the slider keel unit 21 to only have the freedom A of the linear reciprocating motion; and alternatively, a movement direction and distance of the slider keel unit 21 may be restricted through a component such as a hinge or a bracket.

The supporting portion 211 is an outer edge portion of the slider keel unit 21 configured to support the massage sleeve 1, and a shape of the supporting portion 211 may be a concave arc shape, a convex arc shape, a wavy shape, or any other irregular shape.

The supporting portion 211 is configured to support and change at least part of an external contour of the massage device 2 (i.e., an external contour of the massage sleeve 1).

In a specific implementation process, a massage head portion 24 is further disposed at one end of the rotating shaft 22 away from the drive motor 20, and the massage head portion 24, driven by its own mechanical structure, pushes the massage sleeve 1 to vibrate or extend/retract to massage the massage area.

The axis L1 intersects with the freedom A.

Figure 8:
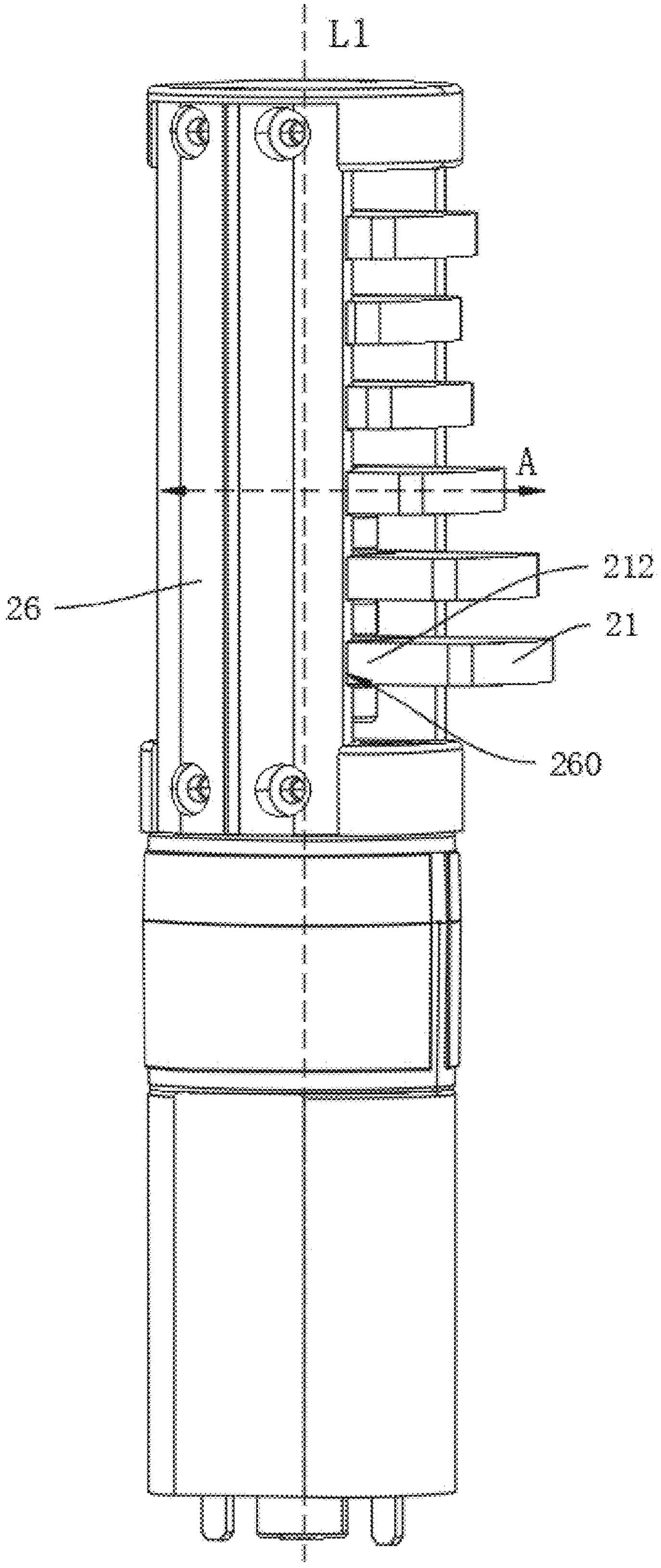
FIG. 8 is a schematic structural diagram of cooperation between a guide member and a rotation constraint portion provided in some embodiments of the present disclosure.

According to some embodiments of the present disclosure, optionally, as shown in FIG. 8, the massage device further includes a guide member 26; a length direction of the guide member 26 is parallel to the axis L1; the guide member 26 is provided with a guide groove 260; and the rotation constraint portion 212 is in sliding fit with the guide groove 260 such that the slider keel unit 21 only has the freedom A of the linear reciprocating motion.

The rotation constraint portion 212 of the slider keel unit 21 is vertically embedded in the guide groove 260 of the guide member 26, and since the length direction of the guide member 26 is parallel to the axis L1, the guide groove 260 only allows the rotation constraint portion 212 to slide in a direction perpendicular to the axis L1 (i.e., strictly retaining the freedom A of the linear reciprocating motion), which restricts rotation, tilting, or lateral displacement of the slider keel unit 21.

The guide groove 260 of the guide member 26 precisely constrains a motion direction of the slider keel unit 21, which enhances the stability of slider motion, and reduces the vibration amplitude; and stable sliding fit between the guide groove 260 and the rotation constraint portion 212 reduces the frictional collision between the first engaging portion 210 and the second engaging portion 2200, and reduces a wear rate, thereby prolonging the service life of the massage device.

According to some embodiments of the present disclosure, optionally, as shown in FIG. 8, the slider keel unit 21 has two limit positions when performing the linear reciprocating motion along the freedom A; and one of the limit positions is located within a contour range of the guide member 26, and the other limit position at least partially extends beyond the contour range of the guide member 26.

The guide member 26 and a portion of the slider keel unit 21 extending beyond the contour range of the guide member 26 jointly define an external contour of the massage device 2.

When the second engaging portion 2200 drives the slider keel unit 21 to move, movement of only the supporting portion 211 of the slider keel unit 21 that extends beyond the contour range of the guide member 26 pushes the external contour of the massage device 2 to change, which ensures that a protrusion is formed only at a target massage area covered by the external contour of the massage device, such that a precise massage effect on the massage area is achieved.

Figure 9:
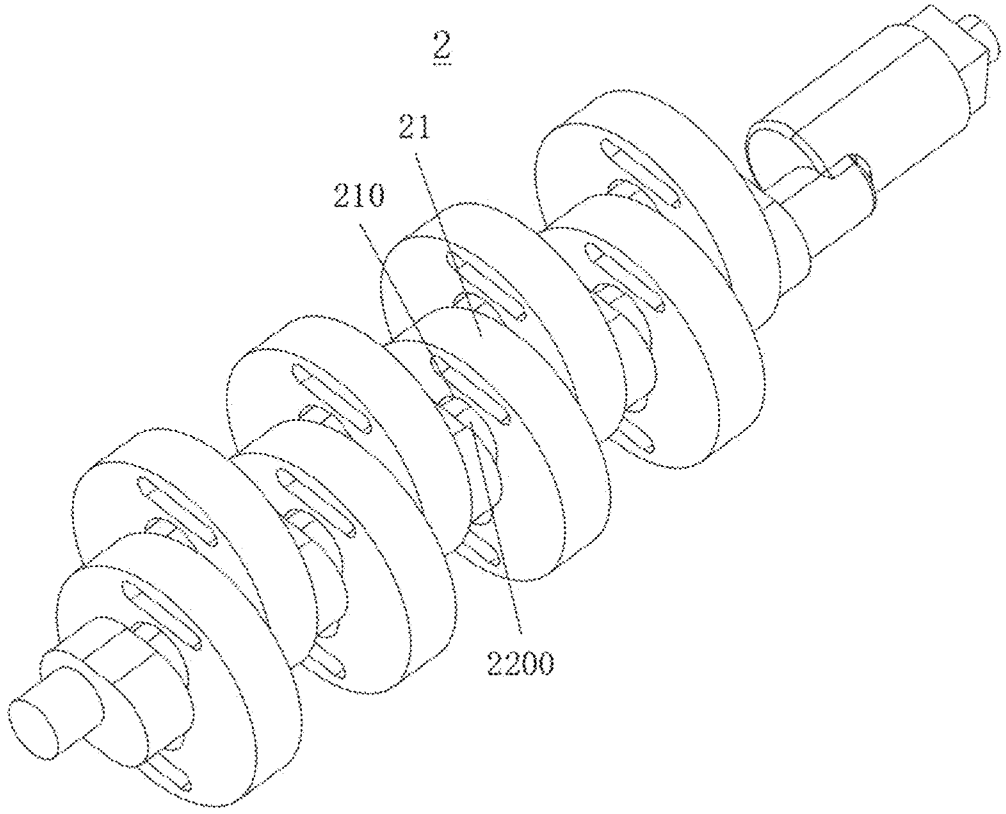
FIG. 9 is a schematic structural diagram of a massage device when a first engaging portion is a cylindrical hole provided in some embodiments of the present disclosure.
Figure 10:
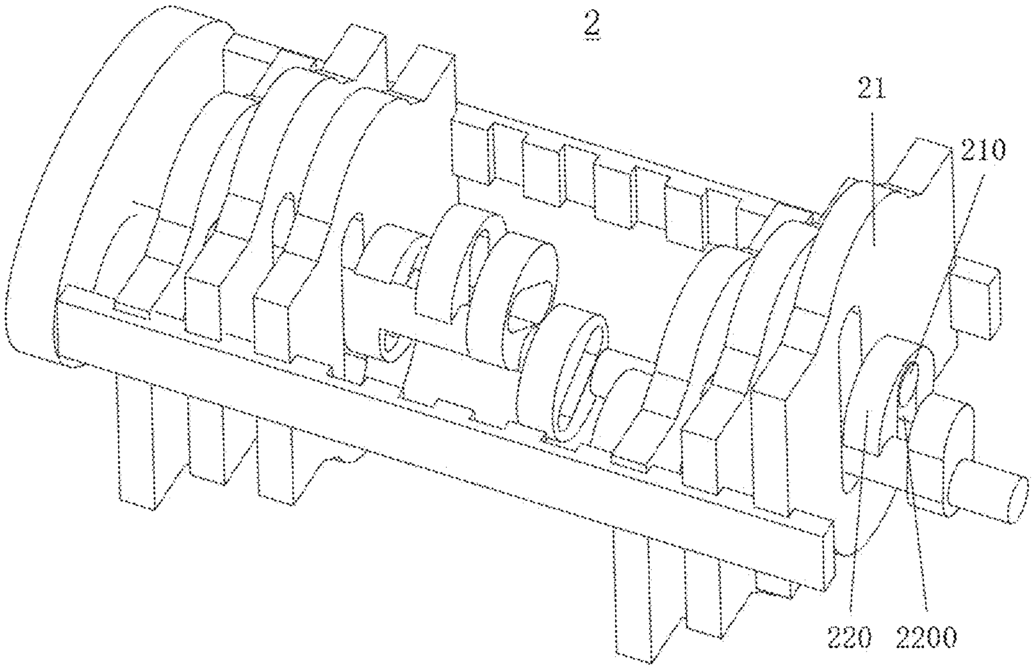
FIG. 10 is a schematic structural diagram of a massage device when a first engaging portion is a cylinder provided in some embodiments of the present disclosure.
Figure 11:
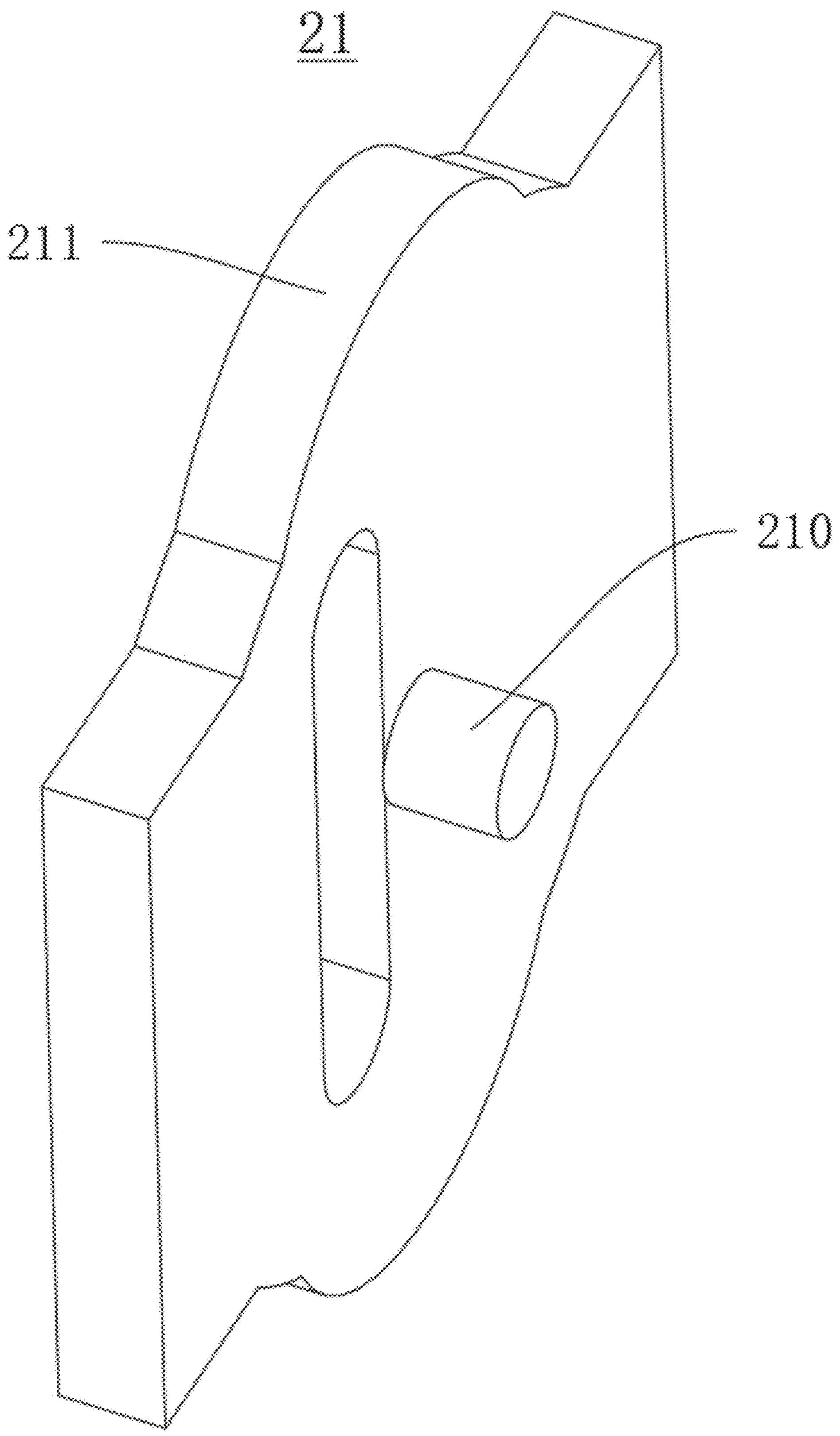
FIG. 11 is a schematic structural diagram of a slider keel unit when a first engaging portion is a cylinder provided in some embodiments of the present disclosure.

According to some embodiments of the present disclosure, optionally, as shown in FIG. 9, the first engaging portion 210 is a cylindrical hole provided with a cylindrical guiding surface 2100; the second engaging portion 2200 is a cylinder; during coupling and interlocking, the cylinder moves and presses the cylindrical guiding surface 2100, such that the slider keel unit 21 passively performs the linear reciprocating motion within the freedom A; or, as shown in FIGS. 10 and 11, the first engaging portion 210 is a cylinder; the second engaging portion 2200 is a cylindrical hole provided with a cylindrical guiding surface 2100; and during coupling and interlocking, the cylindrical guiding surface 2100 moves and presses the cylinder, such that the slider keel unit 21 passively performs the linear reciprocating motion within the freedom A.

The "cylindrical shape" mentioned in the present disclosure refers to a shape enclosed by an inner wall of a portion between two opposite surfaces of the slider keel unit 21 which the hole extends to.

An inner wall surface of the cylindrical hole that abuts against the cylinder and pushes the first engaging portion 210 (i.e., the slider keel unit 21) to perform the linear reciprocating motion along the freedom A is the cylindrical guiding surface 2100.

An annular oil storage groove may be opened on the cylindrical guiding surface 2100 or a surface of the cylinder, and internally contains a solid lubricant (such as graphite or lubricating grease), which achieves long-term maintenance-free lubrication and further reduces a friction coefficient.

When the first engaging portion 210 is a cylindrical hole and the second engaging portion 2200 is a cylinder, an inner surface of the cylindrical hole forms the complete cylindrical guiding surface 2100, and each shaft unit 220 of the rotating shaft 22 is provided with a cylinder (such as a cylindrical boss) adapted to the cylindrical hole as the second engaging portion 2200, where an outer diameter of the cylinder is slightly smaller than an inner diameter of the cylindrical hole, and a clearance fit is formed therebetween. When the drive motor 20 drives the rotating shaft 22 to rotate, the cylinder performs a circumferential motion around the axis L1 with the shaft unit 220, and an outer circumferential surface of the cylinder continuously presses the cylindrical guiding surface 2100 of the cylindrical hole during the motion. Since the slider keel unit 21 moves only in the direction of the freedom A due to restriction by the rotation constraint portion 212, a rotational force of the cylinder is converted into a linear driving force through a pressing action of the guiding surface, which forces the slider keel unit 21 to passively perform the reciprocating motion in the direction of the freedom A.

When the first engaging portion 210 is a cylinder and the second engaging portion 2200 is a cylindrical hole, the cylinder is embedded in the cylindrical hole to form a clearance fit, and when the rotating shaft 22 rotates, the cylindrical hole rotates around the axis L1 with the shaft unit 220, and in this case, an inner surface of the cylindrical guiding surface 2100 continuously presses the outer circumferential surface of the cylinder. Due to restriction by the rotation constraint portion 212, the cylinder cannot rotate with the hole, which, only under the pressing action of the cylindrical guiding surface 2100, drives the slider keel unit 21 to passively perform the reciprocating motion in the direction of the freedom A.

The cylindrical guiding surface 2100 has a guiding function, which further limits a relative displacement between the first engaging portion 210 and the second engaging portion 2200, and in combination with limiting by the rotation constraint portion 212, a reciprocating motion trajectory deviation of the slider keel unit 21 is small; a relative motion between the cylinder and the cylindrical guiding surface 2100 is a uniform circumferential friction, which prevents localized excessive wear caused by an asymmetric structure, and the service life of a fitting surface is longer than that of a traditional irregular fitting structure; and a cylindrical structure of clearance fit allows for a higher tolerance for the processing and assembly accuracy, and even if there exists a slight dimensional deviation, stable contact between the cylinder and the cylindrical guiding surface 2100 is still maintained, thereby reducing a defect rate during production.

Subsequently, the present disclosure will be described by taking the case where the first engaging portion 210 is a cylindrical hole and the second engaging portion 2200 is a cylinder as an example.

Figure 12:
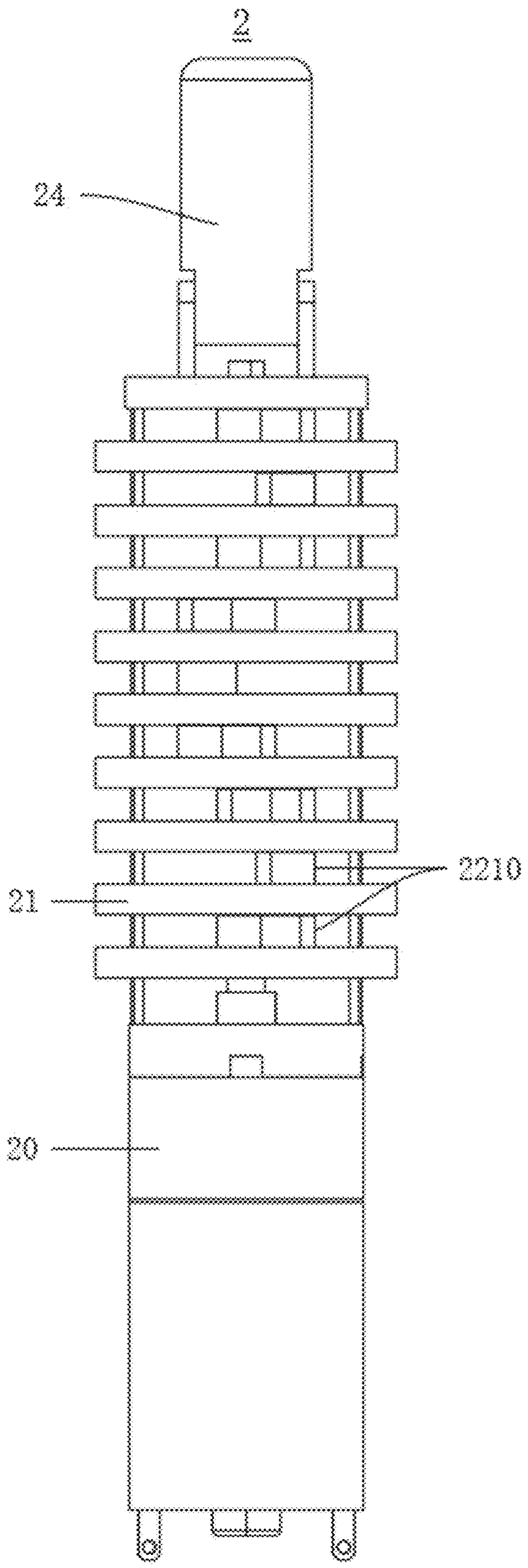
FIG. 12 is a schematic structural diagram of a massage device when a connecting portion is fitted with a slider keel unit provided in some embodiments of the present disclosure.
Figure 13:
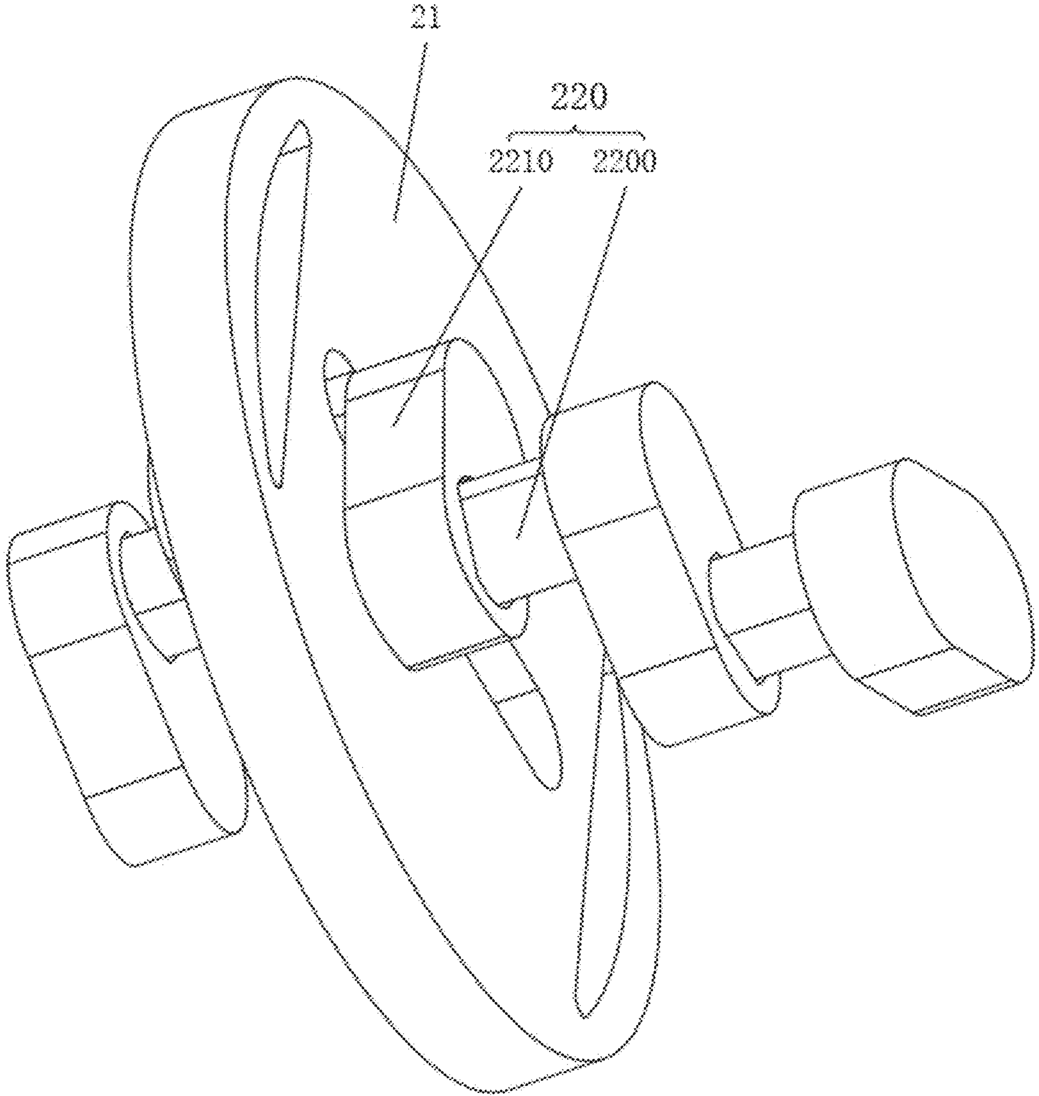
FIG. 13 is a schematic structural diagram of a connecting portion fitted with a slider keel unit provided in some embodiments of the present disclosure.

In a specific implementation process, as shown in FIGS. 12 and 13, each of the shaft units 220 further includes a connecting portion 2210, the adjacent cylinders are connected through the connecting portion 2210, a length direction of the connecting portion 2210 is perpendicular to the axis L1, and two opposite surfaces of the slider keel unit 21 in the direction of the axis L1 are respectively fitted with the two adjacent connecting portions 2210 for limiting.

Figure 14:
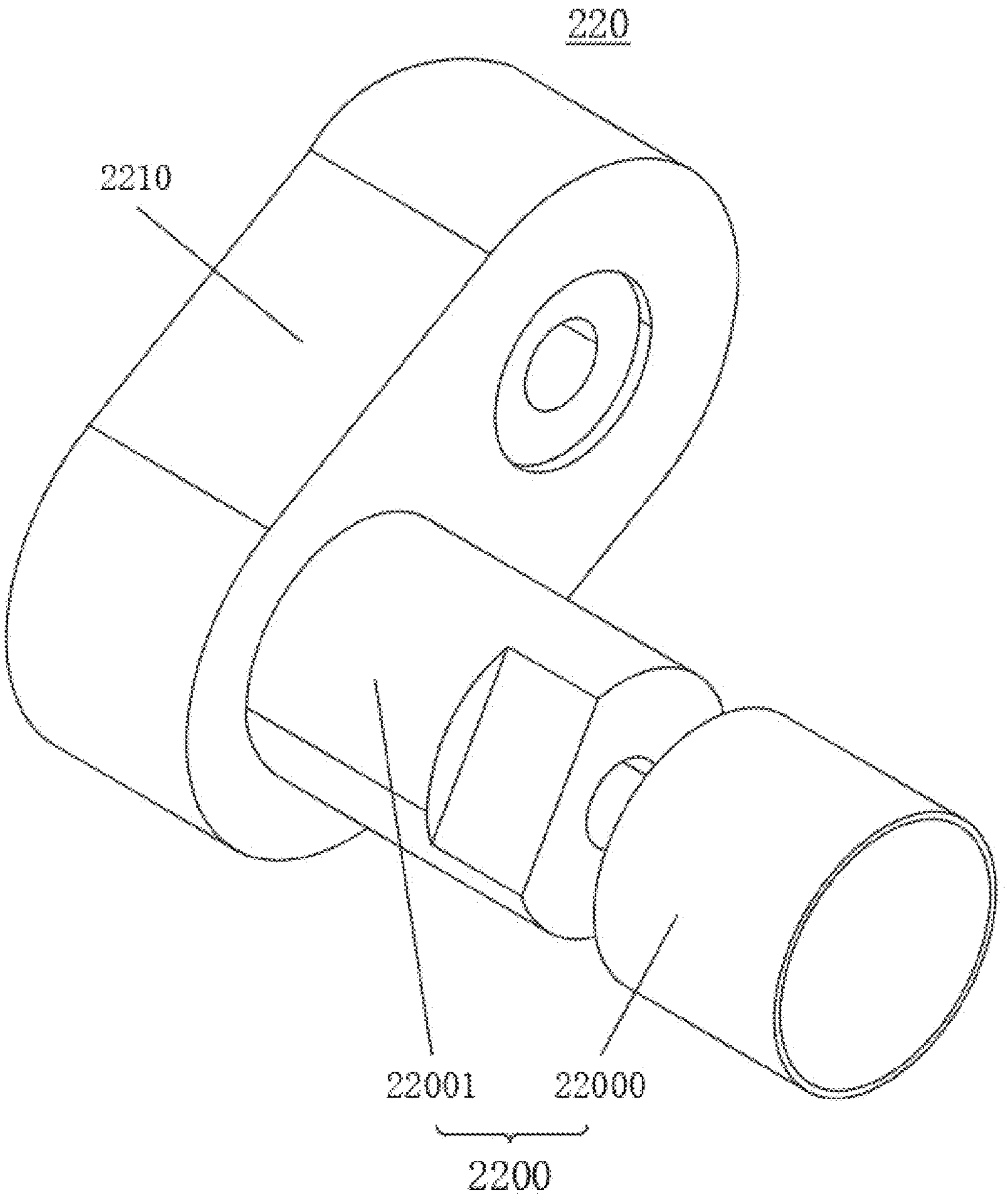
FIG. 14 is a schematic structural diagram of a shaft core and a sleeve provided in some embodiments of the present disclosure.

According to some embodiments of the present disclosure, optionally, as shown in FIG. 14, the cylinder is provided with a sleeve 22000 and a shaft core 22001; and the sleeve 22000 is movably sleeved on an outer side of the shaft core 22001, and the sleeve 22000 includes at least one surface area parallel to the axis L1, such that the first engaging portion 210 and the second engaging portion 2200 are in surface contact when coupled with each other.

The sleeve 22000 and the shaft core 22001 may be in clearance fit, and lubricating grease is arranged between them such that the sleeve 22000 rotates flexibly.

The sleeve 22000 is detachably connected to the shaft core 22001, and the sleeve damaged after long-term use may be disassembled and replaced.

The surface area is an arc surface in contact with the cylindrical guiding surface 2100.

The shaft core 22001 of the cylinder has a rigid structure (such as a metal shaft), and an axis thereof coincides with an original axis of the cylinder; and the sleeve 22000 is a movable component (such as a wear-resistant plastic or a metal sleeve), and an inner hole thereof is in clearance fit with the shaft core 22001 and may rotate flexibly or slide slightly axially around the shaft core 22001. At least one surface area parallel to the axis L1 is processed on an outer surface of the sleeve 22000, the surface area extends in an axial direction of the sleeve 22000, and a width thereof is not less than a contact width of the cylindrical guiding surface 2100, which ensures that a planar area of the sleeve 22000 is in stable surface contact with the cylindrical guiding surface 2100 when the first engaging portion 210 and the second engaging portion 2200 are coupled with each other. When the drive motor 20 drives the rotating shaft 22 to operate, the cylinder rotates around the axis L1 with the shaft unit 220, and the sleeve 22000 is adaptively posture-adjusted due to its movable characteristics. When the cylinder of the second engaging portion 2200 rotates, a surface area of the sleeve 22000 parallel to the axis L1 is always fitted with the cylindrical guiding surface 2100 of the cylindrical hole of the first engaging portion 210, and in this case, a pressing force of the cylinder on the guiding surface is transmitted through the planar area, and a thrust direction is parallel to the direction of the freedom A. Since the slider keel unit 21 moves only in the direction of the freedom A, the thrust directly drives the slider keel unit 21 to perform the reciprocating motion in a movement direction, and the thrust direction is consistent with the movement direction.

A thrust direction of the first engaging portion 210 relative to the second engaging portion 2200 is consistent with a movement direction of the slider keel unit 21, without lateral component loss, and the thrust acts entirely in the movement direction, which improves force transmission efficiency, and increases a massage intensity under the same motor power; no additional friction is caused by a lateral force, a wear rate of the fitting surface is reduced, and the service life of the massage device is prolonged; and a stable thrust direction causes a small motion trajectory deviation of the slider keel unit 21, which drives to uniformly increase a pressing force applied by the massage sleeve 1 to the massage area, and prevents the problem of local excessive pressing or missed pressing.

Figure 15:
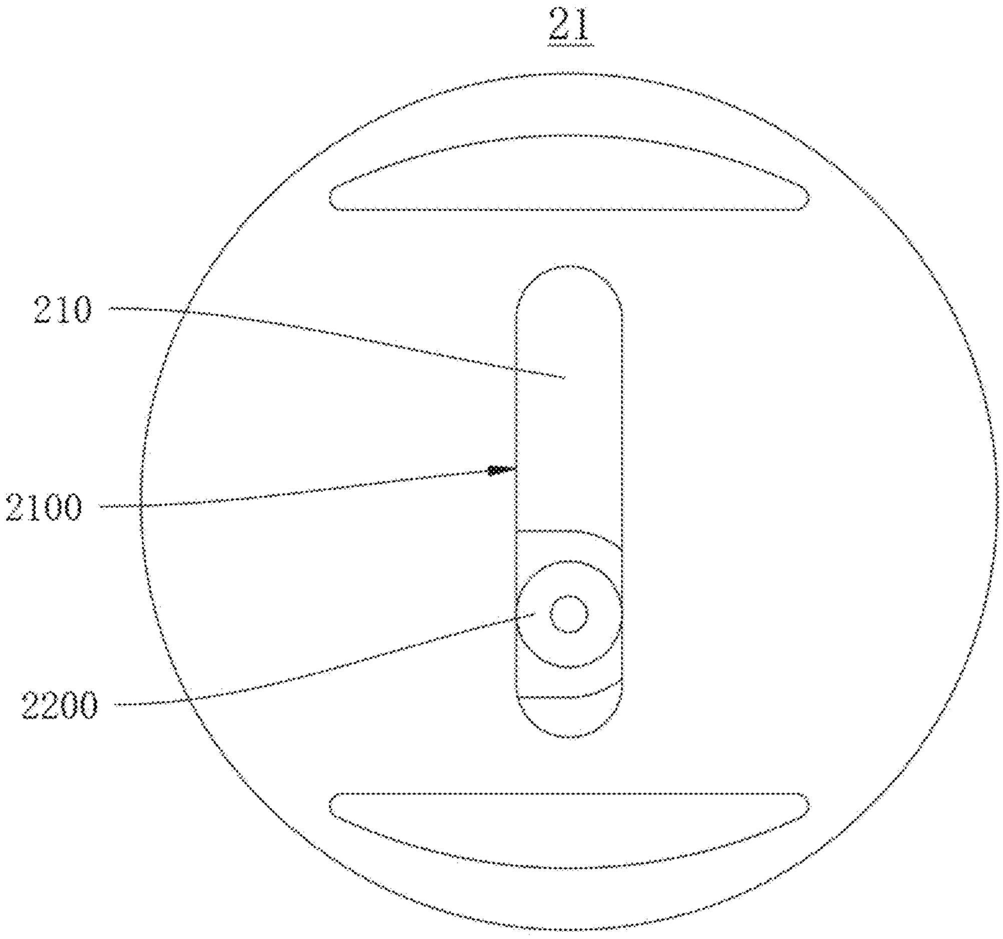
FIG. 15 is a schematic structural diagram of a waist-shaped cylindrical hole provided in some embodiments of the present disclosure.

According to some embodiments of the present disclosure, optionally, as shown in FIG. 15, a cross-section of the cylindrical hole is waist-shaped.

The waist-shaped cross-section (also known as an elongated circular cross-section) is formed by smoothly connecting two parallel straight line segments and two symmetrical semicircular segments, where a length direction of the two straight line segments is perpendicular to the direction of the freedom A, and a diameter of the semicircular segments is equal to a spacing between the straight line segments.

When the drive motor 20 drives the rotating shaft 22 to rotate, the cylinder of the second engaging portion 2200 rotates around the axis L1 with the rotating shaft 22, and during the motion, an outer surface of the cylinder is always in contact with the cylindrical guiding surface 2100 of the waist-shaped hole, and the cylinder directly applies a thrust by pressing the cylindrical guiding surface 2100. Since a length direction of the cylindrical guiding surface 2100 is perpendicular to the freedom A and the slider keel unit 21 moves only in the direction of the freedom A due to restriction by the rotation constraint portion 212, the guiding surface converts the rotational force of the cylinder into a linear thrust in the direction of the freedom A to drive the slider keel unit 21 to perform the reciprocating motion.

The length direction of the waist-shaped cylindrical guiding surface 2100 is perpendicular to the freedom A, which rigidly limits a component of the thrust perpendicular to the movement direction, ensures a small deviation in the thrust direction, and prevents lateral displacement of the slider keel unit 21 during the motion; and the waist-shaped cylindrical guiding surface 2100 offers clear guiding constraints, and in combination with limiting by the rotation constraint portion 212, trajectory stability of the slider keel unit 21 during the reciprocating motion is enhanced, without deflection or jittering.

Figure 16:
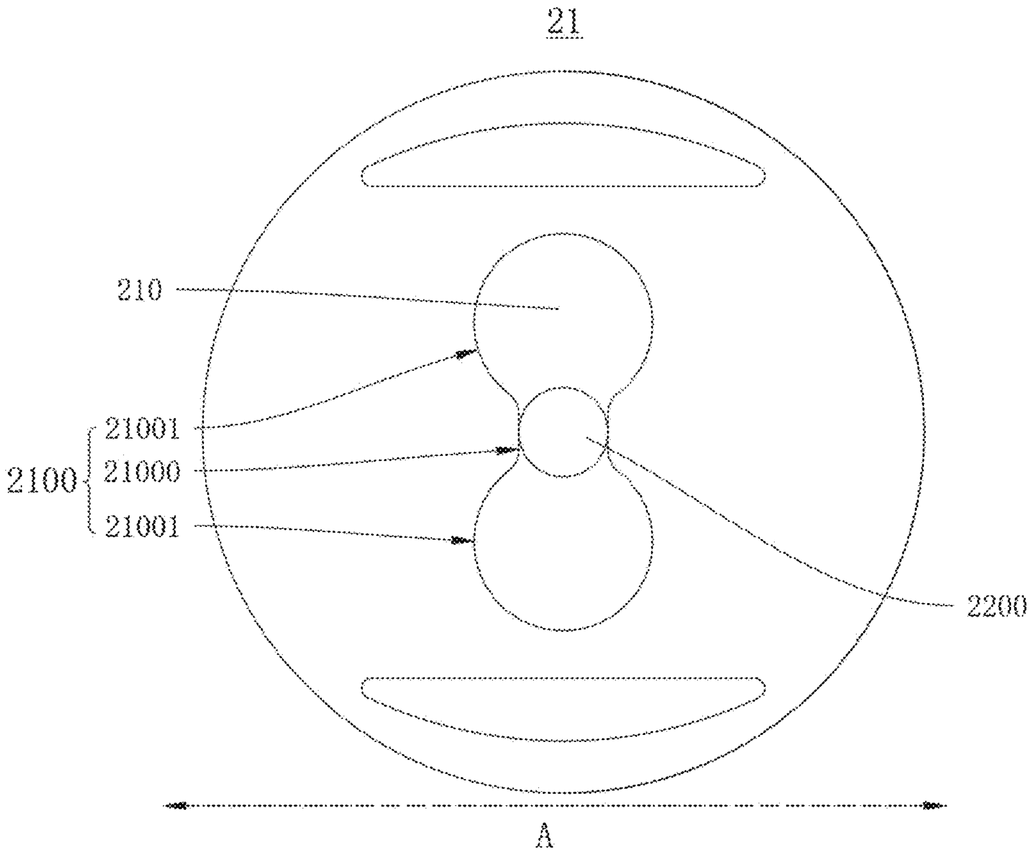
FIG. 16 is a schematic structural diagram when a cross-sectional width of a central area of a cylindrical hole is smaller than a structural width of two end areas provided in some embodiments of the present disclosure.

According to some embodiments of the present disclosure, optionally, as shown in FIG. 16, in the direction perpendicular to the freedom A, a cross-sectional width of a central area of the cylindrical hole is smaller than a cross-sectional width of two end areas.

The cross-sectional width gradually transitions smoothly from the center to the two ends, and a length of a transition segment is not less than one-third of a stroke to prevent stress concentration caused by sudden changes; and a width of the central area matches a diameter of the cylinder to ensure a thrust constraint effect of a main guiding surface.

A cross-sectional width of the cylindrical hole (a dimension in the direction of the freedom A) shows a symmetrical distribution of being narrow in a middle and wide at both ends in the direction perpendicular to the freedom A: A cross-sectional width of the central area (an area corresponding to a middle position in the direction perpendicular to the freedom A) is adapted to a dimension of the cylinder in this direction to form a clearance fit, and this area is a main pushing segment 21000 of the cylindrical guiding surface 2100 and a core interface for thrust transmission; and a cross-sectional width of the two end areas (edge areas on both sides in the direction perpendicular to the freedom A) is larger, and the two end areas are auxiliary pushing segments 21001 of the cylindrical guiding surface 2100. When the drive motor 20 drives the rotating shaft 22 to rotate, the cylinder comes into contact with different segments of the cylindrical guiding surface 2100 with motion trajectory changes in the cylindrical hole: When the cylinder rotates around the axis L1 to the middle position in the direction perpendicular to the freedom A, the cylinder is located in a range of the main pushing segment 21000 of the cylindrical guiding surface 2100, and since a cross-sectional width of this area is small, the rotational force of the cylinder is forced to be transmitted as a thrust only in the direction of the freedom A to prevent thrust dispersion; when the cylinder approaches two side edges in the direction perpendicular to the freedom A during rotation, the cylinder gradually slides from the main pushing segment 21000 to the auxiliary pushing segment 21001, and in this case, widened cross-sections at both ends provide a tiny movable space for the cylinder in the direction of the freedom A; and due to the cooperation of the rotation constraint portion 212, a narrow cross-section of the central area ensures a precise thrust direction through rigid limiting, and wide cross-sections at both ends absorb an impact during rotation through flexible buffering, thereby ensuring the smoother reciprocating motion of the slider keel unit 21. When the cylinder slides from the auxiliary pushing segment 21001 to the main pushing segment 21000, since the cross-sectional width of the central area is smaller than the cross-sectional width of two end areas, the slider keel unit 21 suddenly moves forward for a certain distance from an original position in a forward direction (this distance is equal to half of a difference between the cross-sectional width of the two end areas and the cross-sectional width of the central area of the cylindrical hole), such that the user feels a sharp rise in a massage intensity, thereby providing a jumping-style massage experience.

According to some embodiments of the present disclosure, optionally, as shown in FIG. 16, the cross-section of the cylindrical hole is a smoothly transitioned figure-of-eight shape.

An endpoint of the freedom A (or any other freedom) mentioned in the present disclosure refers to a limit position where the slider keel unit 21 moves in the direction of the freedom A (or any other freedom).

The figure-of-eight cross-section is formed by smoothly connecting two symmetrical circular (or elliptical) areas through a narrow middle area, presenting an overall symmetrical distribution: The narrow middle area is a central area in the direction perpendicular to the freedom A, and a cross-sectional width thereof (a dimension in the direction of the freedom A) is adapted to a dimension of the cylinder in this direction to form a clearance fit, and an inner wall of this area is the main pushing segment 21000 of the cylindrical guiding surface 2100 and the core interface for thrust transmission; and circular areas on both sides are the two end areas in the direction perpendicular to the freedom A, and the cross-sectional width (the dimension in the direction of the freedom A) thereof is larger than that of the narrow middle area, and inner walls of the circular areas are the auxiliary pushing segments 21001 of the cylindrical guiding surface 2100, and the auxiliary pushing segments 21001 transition smoothly with the main pushing segment 21000 through an arc-shaped transition segment without sharp edges or sudden changes.

Figure 17:
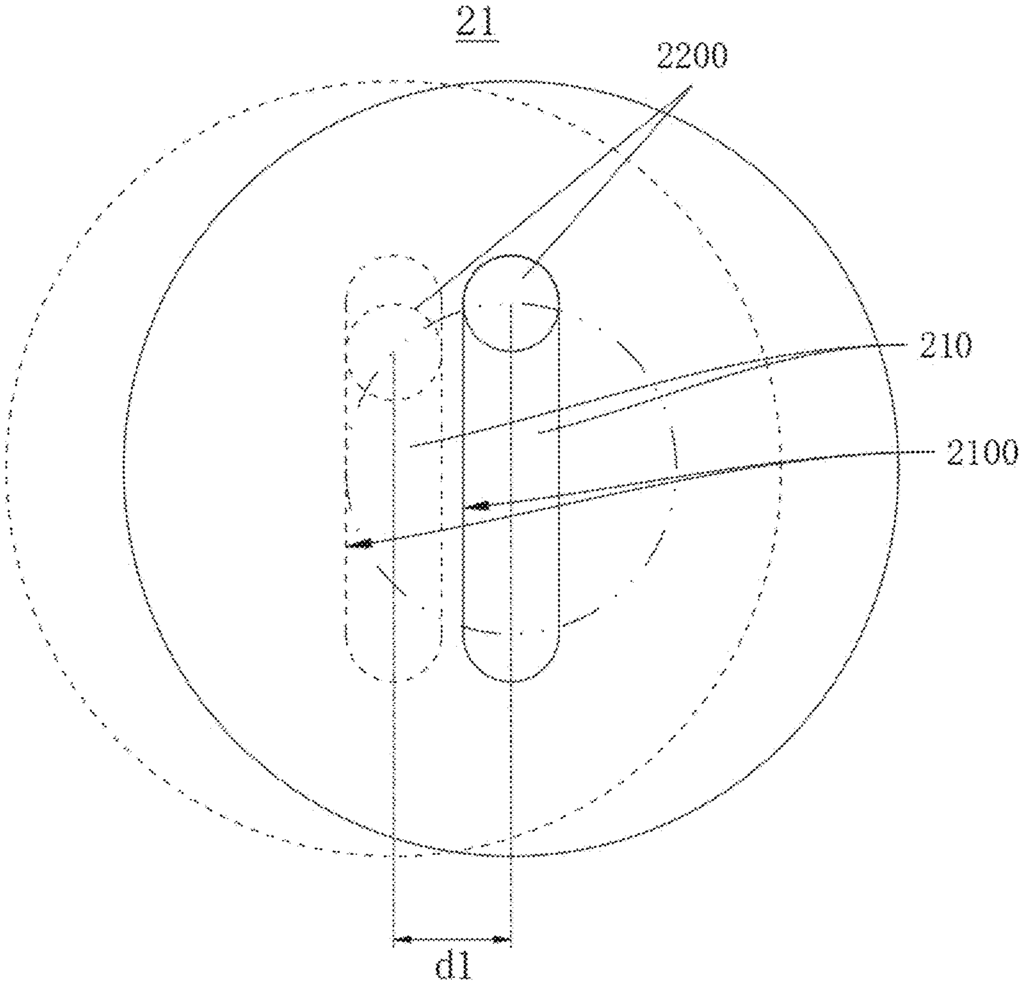
FIG. 17 is a schematic diagram of a displacement distance of a slider keel unit when a cylinder abuts against an auxiliary pushing segment during rotation where a cylindrical hole is waist-shaped provided in some embodiments of the present disclosure.
Figure 18:
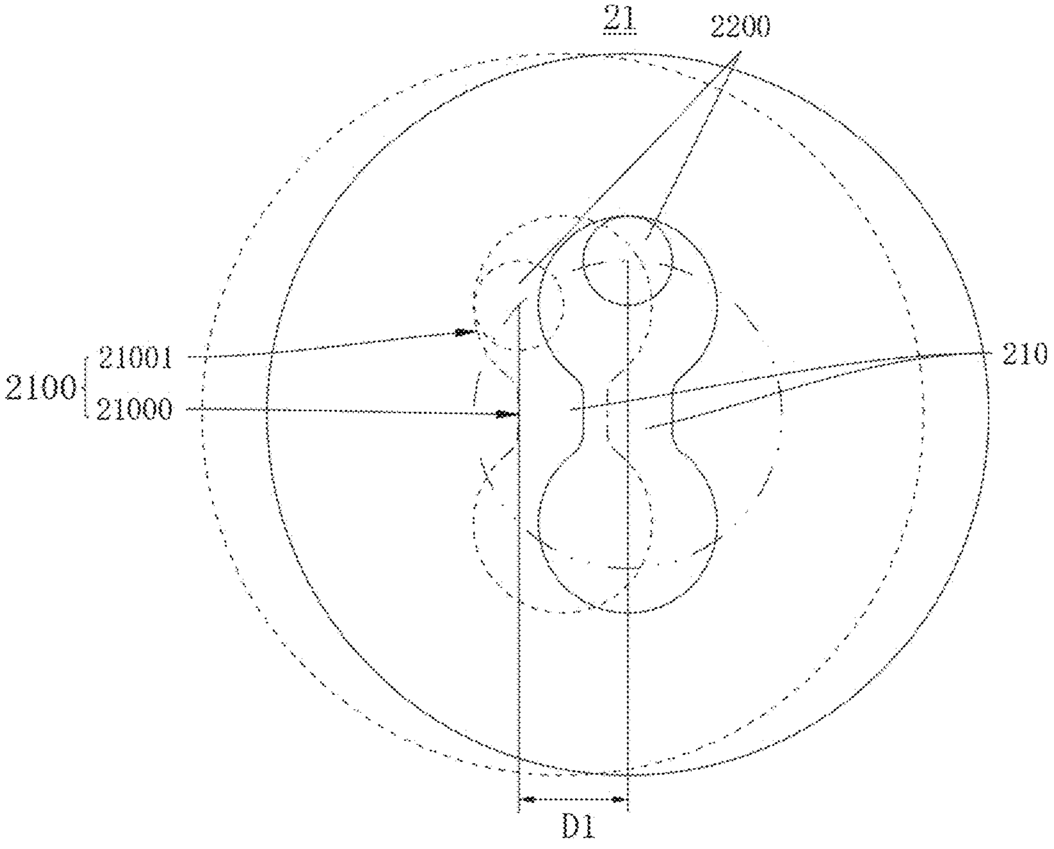
FIG. 18 is a schematic diagram of a displacement distance of a slider keel unit when a cylinder abuts against an auxiliary pushing segment during rotation where a cylindrical hole is figure-of-eight-shaped provided in some embodiments of the present disclosure.
Figure 19:
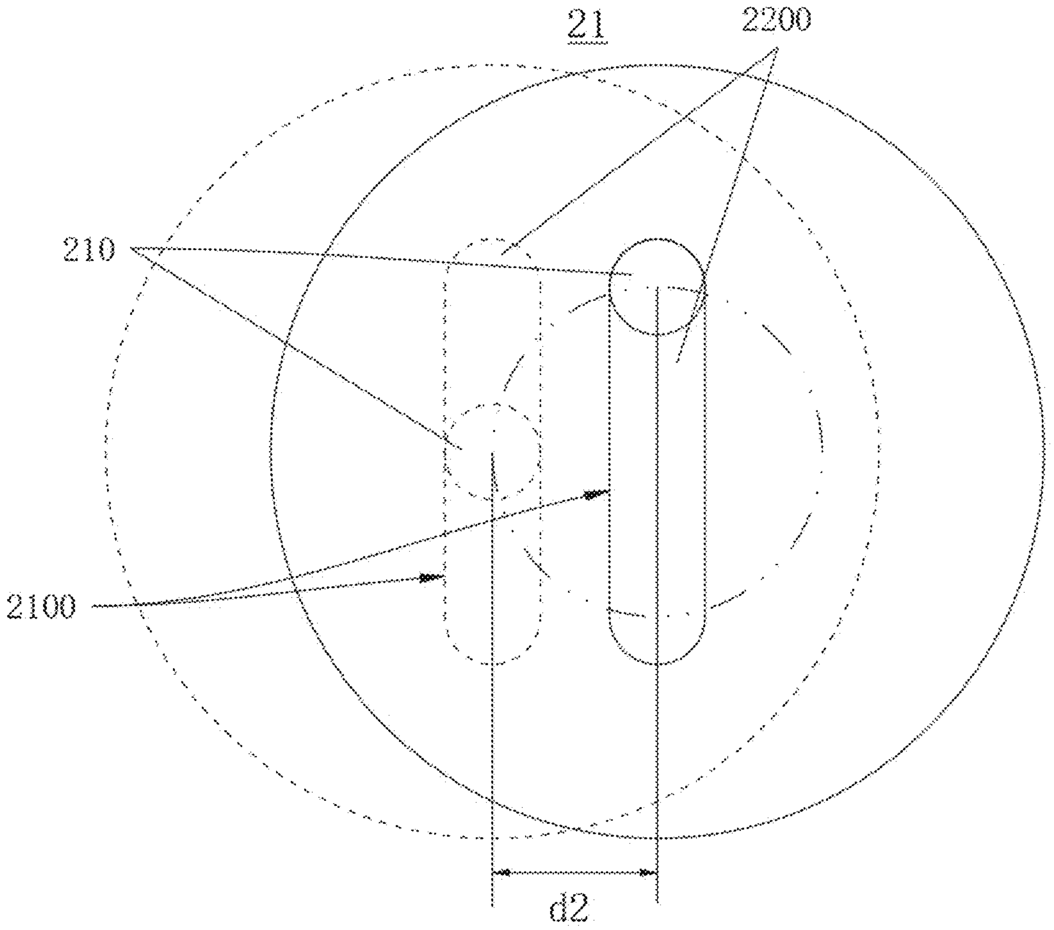
FIG. 19 is a schematic diagram of a displacement distance of a slider keel unit when a cylinder abuts against a main pushing segment during rotation where a cylindrical hole is waist-shaped provided in some embodiments of the present disclosure.
Figure 20:
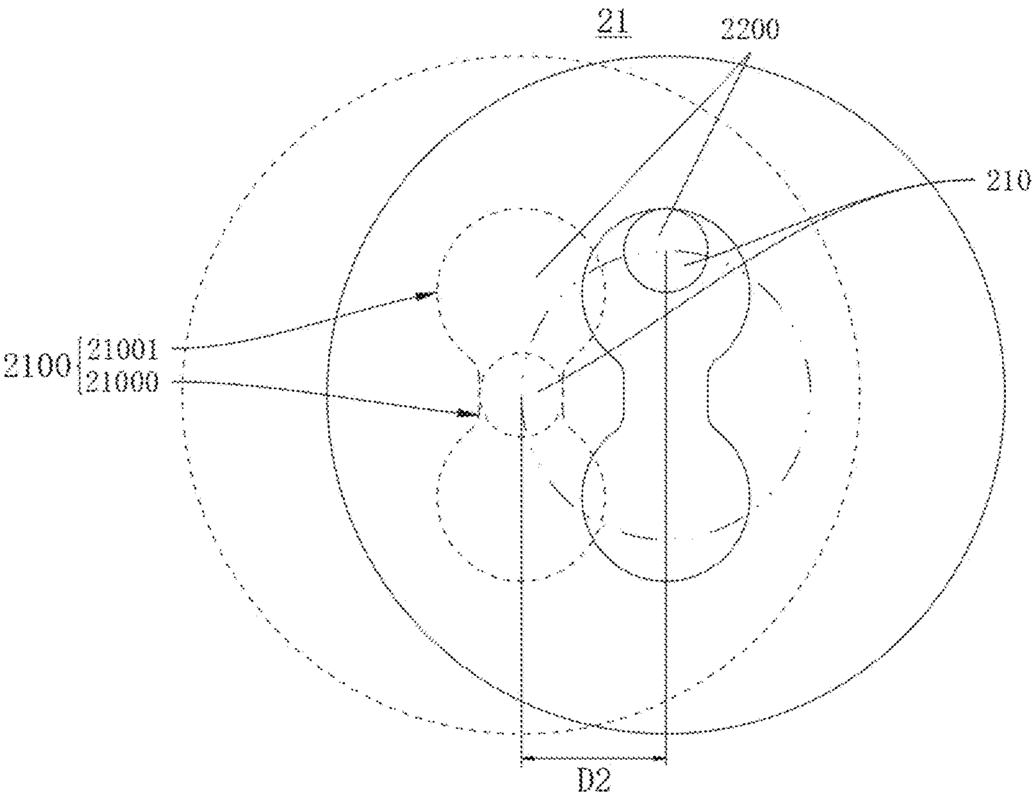
FIG. 20 is a schematic diagram of a displacement distance of a slider keel unit when a cylinder abuts against a main pushing segment during rotation where a cylindrical hole is figure-of-eight-shaped provided in some embodiments of the present disclosure.

In a specific implementation process, the slider keel unit 21 is located at a midpoint of the freedom A as a starting point, the drive motor 20 drives the rotating shaft 22 to rotate such that the cylinder (i.e., the second engaging portion 2200) rotates around the axis L1, and during the rotation, the cylinder sequentially abuts against the auxiliary pushing segment 21001, the main pushing segment 21000, and the auxiliary pushing segment 21001. As shown in FIGS. 17 and 18, when the cylinder abuts against the auxiliary pushing segment 21001 during rotation, a distance d1 that the slider keel unit 21 moves in the direction of the freedom A when the cylindrical hole is waist-shaped is greater than a distance D1 that the slider keel unit 21 moves in the direction of the freedom A when the cylindrical hole is figure-of-eight-shaped. As shown in FIGS. 19 and 20, when the cylinder continues to rotate until abutting against the main pushing segment 21000, the slider keel unit 21 moves to the endpoint of the freedom A, and a distance d2 that the slider keel unit 21 moves in the direction of the freedom A when the cylindrical hole is waist-shaped is equal to a distance D2 that the slider keel unit 21 moves in the direction of the freedom A when the cylindrical hole is figure-of-eight-shaped. It can be seen that during the sliding of the cylinder from the auxiliary pushing segment 21001 to the main pushing segment 21000, a moving distance of the slider keel unit 21 when the cylindrical hole is figure-of-eight-shaped is larger than a moving distance of the slider keel unit 21 when the cylindrical hole is waist-shaped, and under the premise that a rotational speed of the rotating shaft 22 is constant, it can be known that a speed of the slider keel unit 21 during the sliding of the cylinder from the auxiliary pushing segment 21001 to the main pushing segment 21000 when the cylindrical hole is figure-of-eight-shaped is faster than a speed thereof during the sliding of the cylinder from the starting point to the auxiliary pushing segment 21001, that is, the slider keel unit 21 suddenly accelerates when moving close to the endpoint of the freedom A when the cylindrical hole is figure-of-eight-shaped. This characteristic enables to provide the user with a jumping-style massage experience (i.e., a significant increase in the massage intensity), and even when the rotating shaft 22 rotates fast (that is, a moving speed of the slider keel unit 21 is greater than a rebound speed of skin in the massage area), a fast tapping massage action may be performed for the massage area.

Output power of the drive motor 20 is adapted to the pushing fit between the cylinder and the cylindrical guiding surface 2100 to enhance the user's massage experience. For example, during the sliding of the cylinder from the starting point to the auxiliary pushing segment 21001, the output power of the drive motor 20 is relatively small; and during the sliding of the cylinder from the auxiliary pushing segment 21001 to the main pushing segment 21000, the output power of the drive motor 20 is relatively large. Faster sudden acceleration of the slider keel unit increases the massage intensity applied to the massage area, and the user feels the more sudden and intense jumping-style massage effect.

When the cylinder abuts against the auxiliary pushing segment 21001 after rotating from the starting point, a moving distance of the slider keel unit 21 of the figure-of-eight-shaped cylindrical hole in the direction of the freedom A is smaller than that of the slider keel unit of the waist-shaped cylindrical hole, and in this case, a motion speed is relatively gentle, thereby achieving a relatively gentle transition for massage; and when the cylinder slides from the auxiliary pushing segment 21001 to the main pushing segment 21000, the moving distance of the slider keel unit 21 of the figure-of-eight-shaped cylindrical hole is significantly larger than that of the slider keel unit of the waist-shaped cylindrical hole. Under the premise that the rotational speed of the rotating shaft 22 is constant, a motion speed of the slider keel unit 21 at the stage where the cylinder slides from the auxiliary pushing segment to the main pushing segment is significantly faster than that at the stage where the cylinder abuts against the auxiliary pushing segment 21001, which forms a motion characteristic of sudden acceleration when approaching the endpoint, and achieves precise speed switching from gentle to fast; and the sudden acceleration when the cylinder enters the main pushing segment 21000 results in that a pressing force of the massage sleeve 1 pushed by the slider keel unit 21 on muscles increases instantly, which presents a jumping-style massage experience of gentle transition and sudden intensity increase, and enhances the layering and stimulation of massage.

Figure 21:
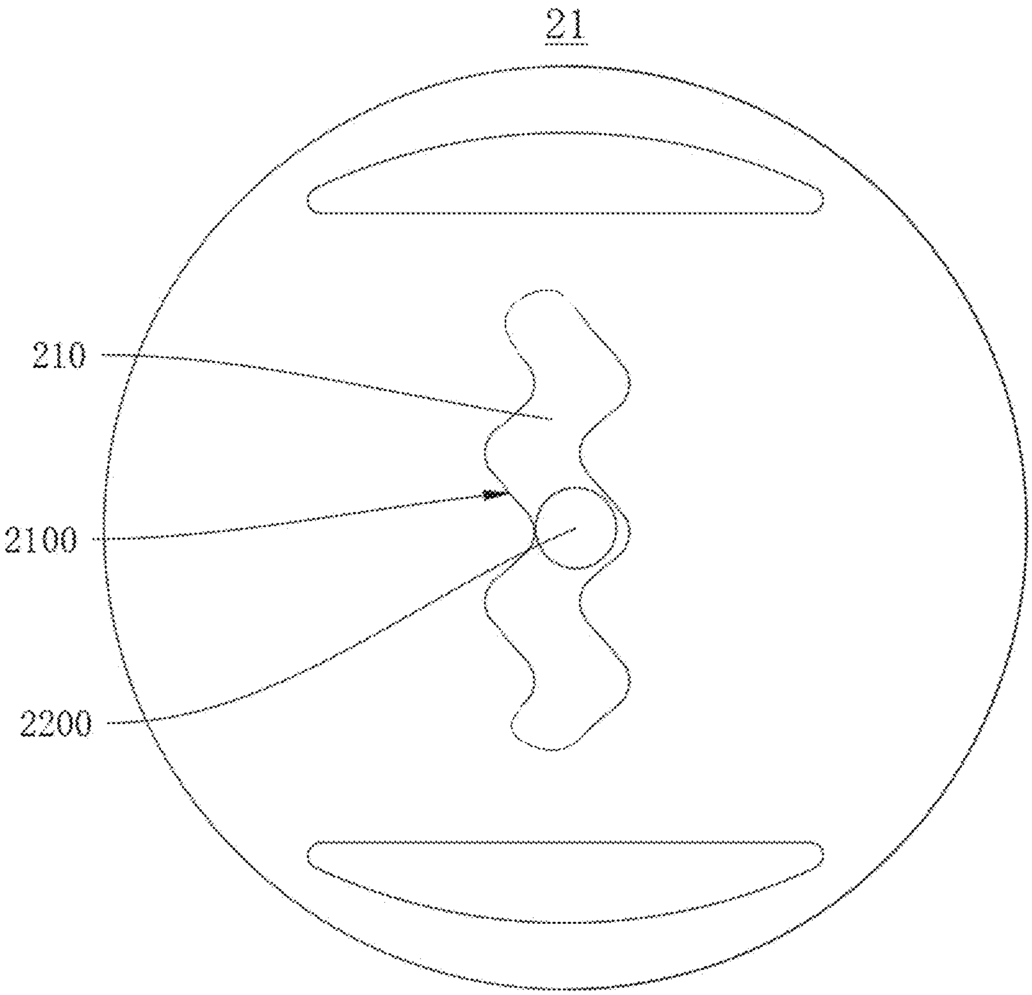
FIG. 21 is a schematic structural diagram of a slider keel unit when a cross-section of a cylindrical hole is of a smoothly transitioned toothed shape provided in some embodiments of the present disclosure.

In a specific implementation process, as shown in FIG. 21, the cross-section of the cylindrical hole may be of a smoothly transitioned toothed shape, and during the process that the cylinder pushes the slider keel unit 21 to move along the freedom A through the cylindrical hole, the cylinder sequentially passes through convex and concave portions on the toothed cylindrical guiding surface 2100, such that the slider keel unit 21 performs a short-distance reciprocating motion along the freedom A during the overall movement toward the endpoint of the freedom A, and the slider keel unit 21 simultaneously applies both pressing and small-amplitude vibration tapping massage actions to the massage area, thereby enriching the user's massage experience.

According to some embodiments of the present disclosure, optionally, the plurality of the slider keel units 21 are divided into multiple groups; and the multiple groups of the slider keel units 21 are arranged along the axis L1 in a staggered manner.

Multiple motion modes such as fast alternation, slow alternation, and grouped synchronization of multiple groups of the slider keel units 21 may be activated by adjusting a phase difference of the shaft units 220 to meet massage needs for different muscle groups.

In the direction of the axis L1, the slider keel units 21 of each group are alternately distributed in projected positions (that is, the supporting portions 211 of the slider keel units 21 of different groups do not overlap in the direction of the axis L1, which forms a staggered layout). When the drive motor 20 drives the rotating shaft 22 to rotate around the axis L1, the second engaging portions 2200 of all the shaft units 220 rotate synchronously. The reciprocating motion of multiple groups of the slider keel units 21 may be performed in two typical rhythms: one is an alternate rhythm, that is, when one group of the slider keel units 21 moves toward the endpoint in the direction of the freedom A, another group of the slider keel units 21 resets toward the midpoint; and when one group thereof resets, another group thereof moves toward the endpoint. The other is a synchronous rhythm, that is, multiple groups of the slider keel units 21 move toward the endpoint in the direction of the freedom A simultaneously, and reset toward the midpoint after reaching the endpoint. Through the two motion rhythms under the staggered layout, the supporting portions 211 push the massage sleeve 1 to form trajectories of alternate pressing or synchronous pressing.

The staggered layout along the axis L1 eliminates massage blind spots arranged in a traditional manner, which increases an effective coverage length, and meets massage needs for large-area muscle groups; in the alternate rhythm, multiple groups of the slider keel units 21 form a cycle of pressing-relaxing-repressing, which simulates the alternate force application with human hands; in the synchronous rhythm, a concentrated and strong pressing effect may be achieved, and the two rhythms prevent muscle adaptation fatigue caused by single continuous pressing, and enhance the comfort and diversity of massage; and the staggered arrangement results in dispersed distribution of massage forces in the direction of the axis L1, and in the alternate or synchronous rhythm, an average pressure exerted on muscles per unit area of the massage area is more balanced, which reduces the discomfort caused by local excessive pressing and ensures the overall massage intensity.

Figure 22:
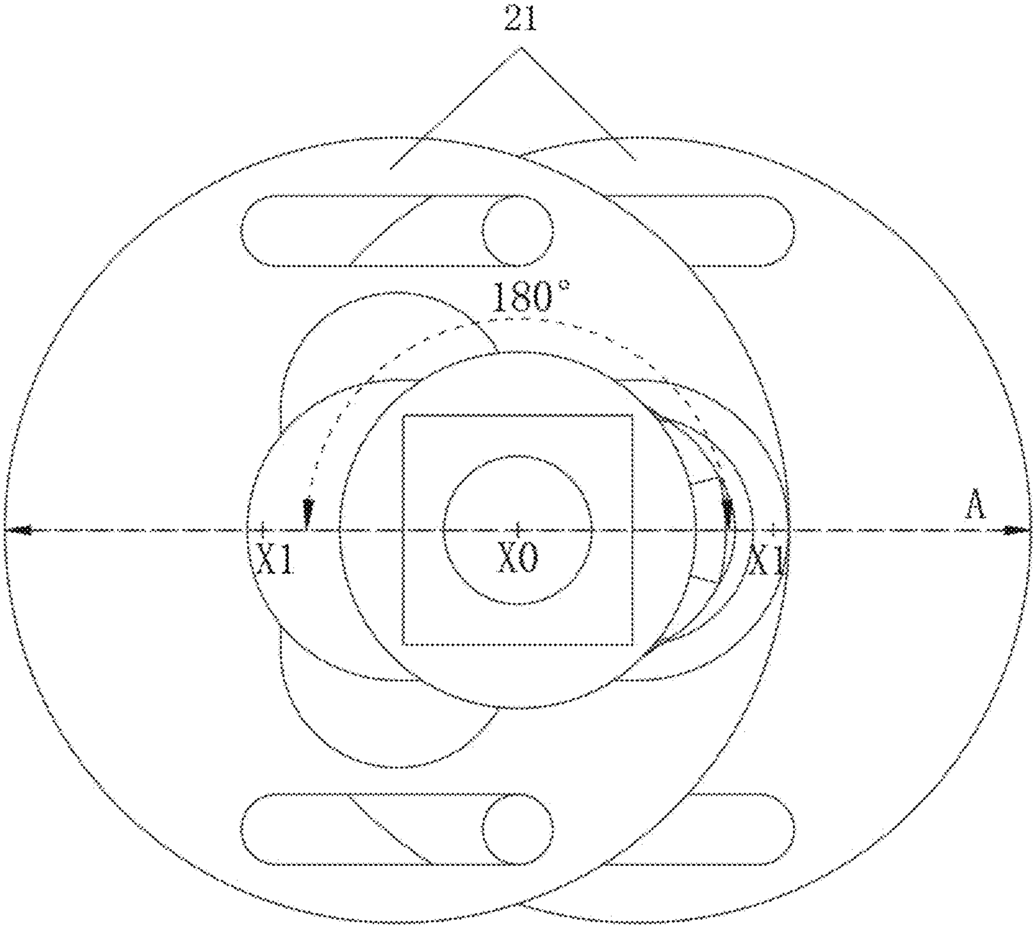
FIG. 22 is a top view of a massage device when slider keel units are divided into two groups provided in some embodiments of the present disclosure.
Figure 23:
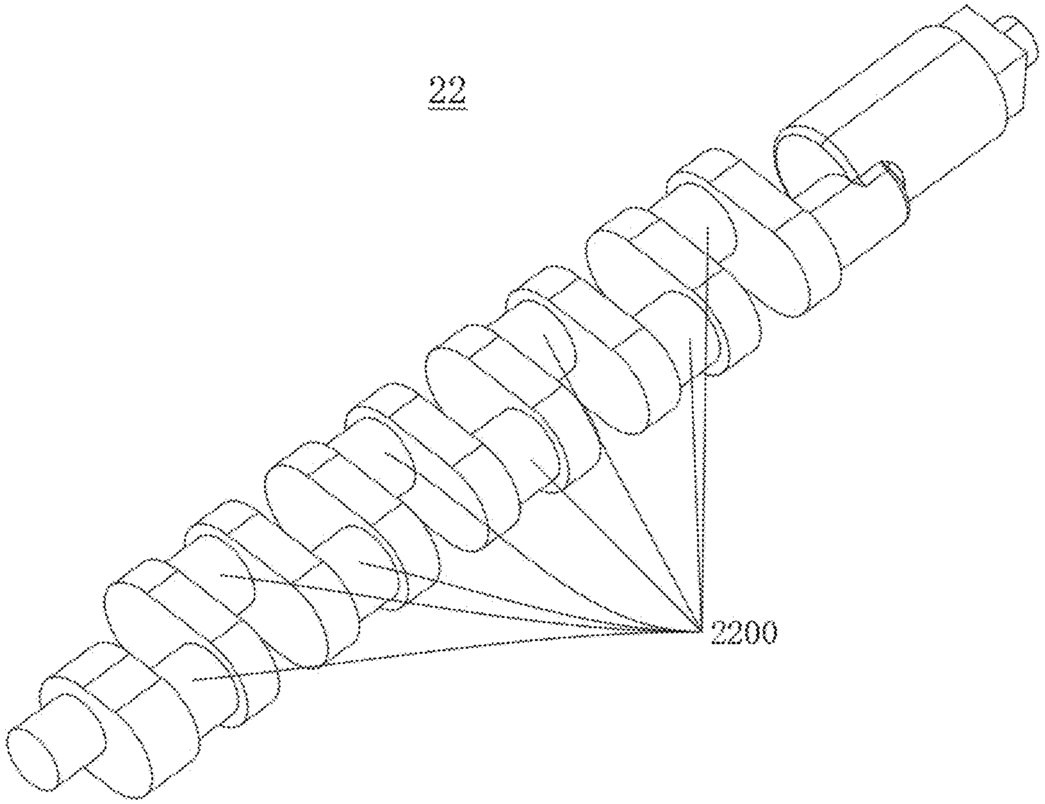
FIG. 23 is a schematic structural diagram of a rotating shaft when slider keel units are divided into two groups provided in some embodiments of the present disclosure.

According to some embodiments of the present disclosure, optionally, as shown in FIGS. 22 and 23, the slider keel units 21 are divided into two groups; projection points X1 of the second engaging portions 2200 of the shaft units 220 on a plane perpendicular to the axis L1 are all located on a same circumference with a projection point X0 of the axis L1 on the plane as a circle center; and an included angle between two lines formed by connecting projection points of the second engaging portions 2200 of two adjacent shaft units 220 with the projection point of the axis L1 is 180°, such that the two groups of the slider keel units 21 are driven by the adjacent shaft units 220 to move in opposite directions along the freedom A.

A plurality of (such as 2n, where n is a positive integer) adjacent shaft units 220 are distributed around the rotating shaft 22 of the massage device 2 along the axis L1, and two groups of the slider keel units 21 are configured correspondingly. The first group of the slider keel units 21 is in coupled interlock with the second engaging portions 2200 of the shaft units 220 with odd serial numbers such as 1, 3, and 5, and the second group of the slider keel units 21 is in coupled interlock with the second engaging portions 2200 of the shaft units 220 with even serial numbers such as 2, 4, and 6; and in the direction of the axis L1, the supporting portions 211 of the two groups of the slider keel units 21 are alternately distributed to form the staggered layout. The second engaging portion 2200 of the shaft unit 220 has an eccentric structure, and an included angle formed by connecting a center of the second engaging portion 2200 with the axis L1 is 180° (that is, eccentric directions are completely opposite). Either group of the slider keel units 21 only retains the freedom for the linear reciprocating motion in the direction of the freedom A.

When the drive motor 20 drives the rotating shaft 22 to rotate around the axis L1, the second engaging portions 2200 of the adjacent shaft units 220 rotate synchronously while maintaining opposite eccentric directions. When the second engaging portions 2200 of the shaft units 220 with odd serial numbers push the first group of the slider keel units 21 in one direction of the freedom A, the second engaging portions 2200 of the shaft units 220 with even serial numbers pull the second group of the slider keel units 21 in the other direction of the freedom A, such that the two groups of the slider keel units 21 move in opposite directions along the freedom A; and when the rotating shaft 22 rotates by 180°, the second engaging portions 2200 of the shaft units 220 with odd serial numbers pull the first group of the slider keel units 21 in the other direction of the freedom A, and the second engaging portions 2200 of the shaft units 220 with even serial numbers push the second group of the slider keel units 21 in one direction of the freedom A, where the two groups of the slider keel units 21 still maintain a reverse motion state. Through the reverse motion, the supporting portions 211 push the massage sleeve 1 to form a reverse pressing trajectory along the freedom A.

The eccentric directions of the second engaging portions 2200 of adjacent shaft units 220 are opposite, and centrifugal forces generated during rotation counteract each other, such that an overall radial vibration amplitude of the massage device is reduced and operation stability is enhanced; and when an overall dimension of the massage device expands in the direction of the freedom A to massage a hole-shaped massage area, a relatively strong pressing massage effect is achieved.

According to some embodiments of the present disclosure, optionally, as shown in FIG. 22, the supporting portion 211 has a convex arc-shaped structure.

Figure 24:
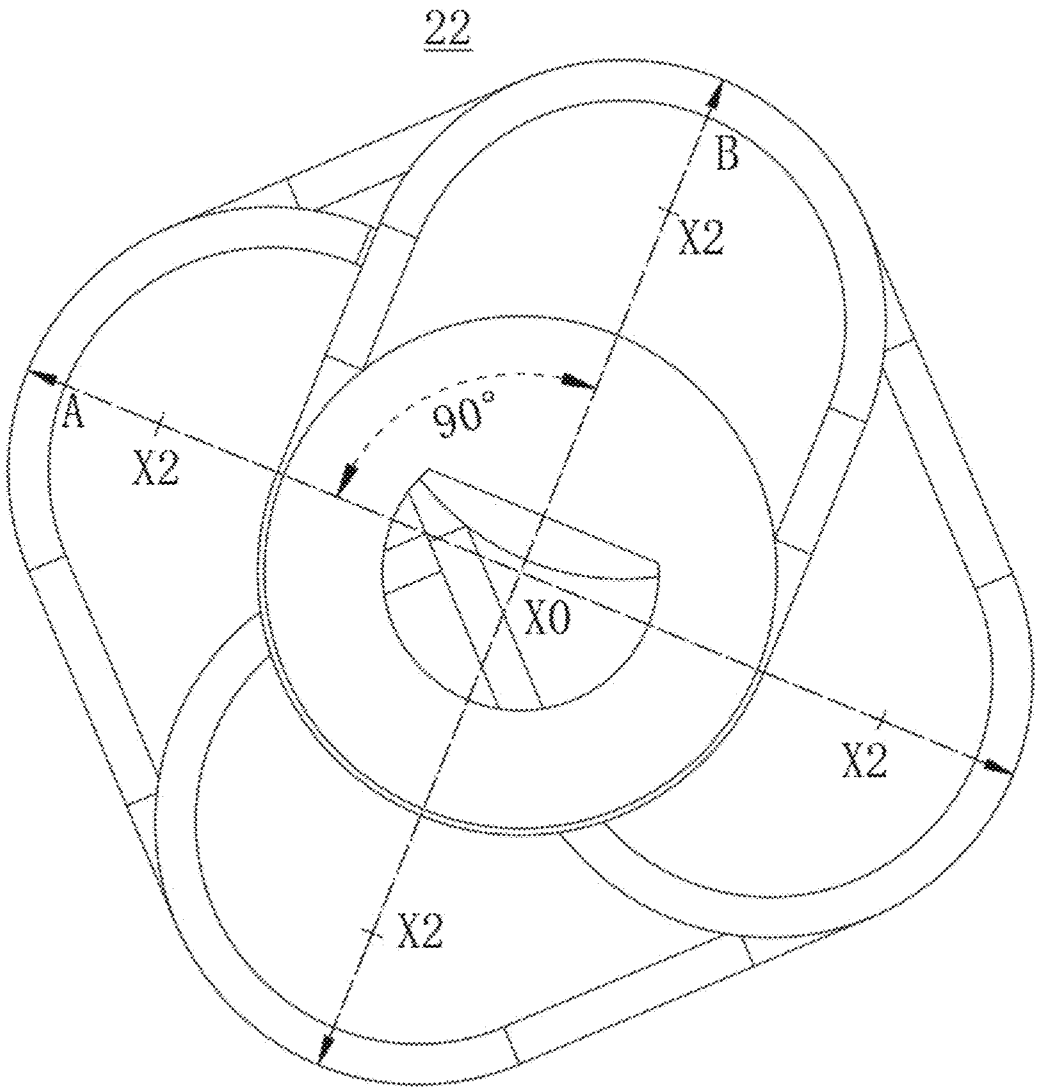
FIG. 24 is a top view of a rotating shaft when slider keel units are divided into four groups provided in some embodiments of the present disclosure.
Figure 25:
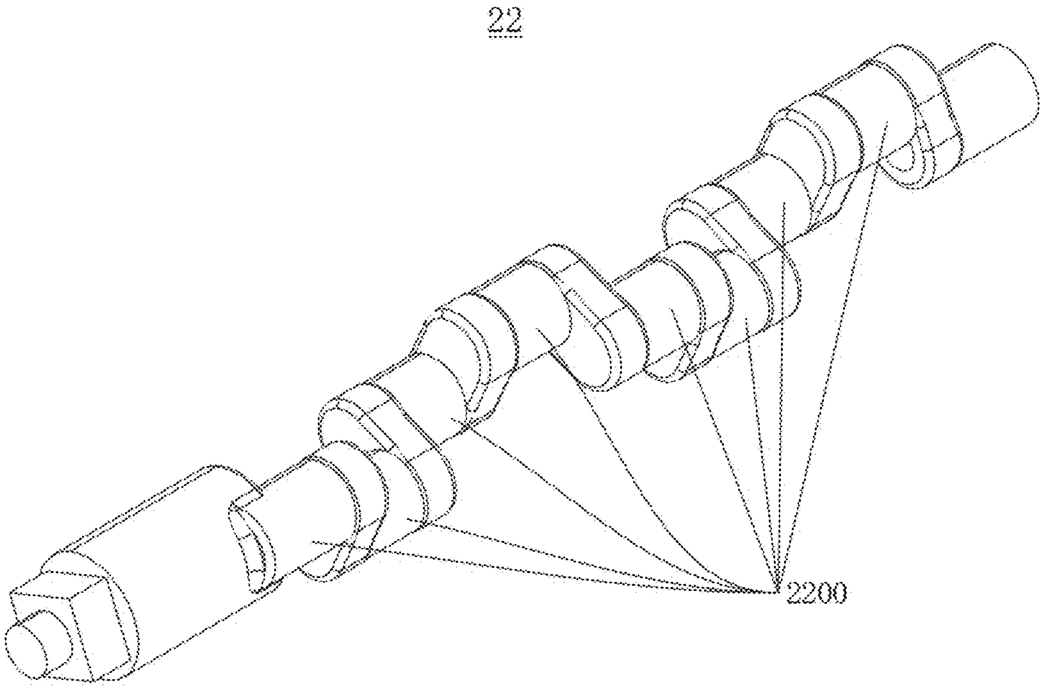
FIG. 25 is a schematic structural diagram of a rotating shaft when slider keel units are divided into four groups provided in some embodiments of the present disclosure.

The convex arc-shaped structure of the supporting portion fits a physiological curve of the massage area, a contact area is significantly increased, and when the overall dimension of the massage device 2 expands to increase the pressure exerted on the massage area, pressure dispersion prevents local compression on the massage area. According to some embodiments of the present disclosure, optionally, as shown in FIGS. 24 and 25, the slider keel units 21 are divided into four groups; where the first group of the slider keel units 21 and the third group of the slider keel units 21 only have the freedom A of the linear reciprocating motion; the second group of the slider keel units 21 and the fourth group of the slider keel units 21 only have a freedom B perpendicular to the freedom A and the axis L1; projection points X2 of the second engaging portions 2200 of the shaft units 220 on a plane perpendicular to the axis L1 are all located on a same circumference with a projection point X0 of the axis L1 on the plane as a circle center; and an included angle between two lines formed by connecting projection points of the second engaging portions 2200 of two adjacent shaft units 220 with the projection point of the axis L1 is 90°, such that the first group of the slider keel units 21 and the third group of the slider keel units 21 move in opposite directions within the freedom A, and at the same time, the second group of the slider keel units 21 and the fourth group of the slider keel units 21 move in opposite directions within the freedom B.

The freedom A intersects with the freedom B, and an intersection point is located on the axis L1.

A plurality of (such as 4$n$, where n is a positive integer) adjacent shaft units 220 are distributed around the rotating shaft 22 of the massage device 2 along the axis L1, and four groups of the slider keel units 21 are configured correspondingly. The first group of the slider keel units 21 and the third group of the slider keel units 21 only retain a motion freedom along the freedom A (in a linear reciprocating direction); and the rotation constraint portions 212 of the second group of the slider keel units 21 and the fourth group of the slider keel units 21 are restricted to move only along the freedom B (in the direction perpendicular to the freedom A and the axis L1). In the direction of the axis L1, the supporting portions 211 of the four groups of the slider keel units 21 are alternately distributed, which forms the staggered layout. The second engaging portion 2200 of all the adjacent shaft units 220 are located on the same circumference with the axis L1 as a circle center, and an included angle formed by connecting centers of the second engaging portions 2200 of the adjacent shaft units 220 with the axis L1 is 90°.

When the drive motor 20 drives the rotating shaft 22 to rotate around the axis L1, the second engaging portions 2200 of the adjacent shaft units 220 move synchronously around the circumference and their phases differ by 90° sequentially. When the first group of the slider keel units 21 is pushed by the second engaging portions 2200 of the corresponding shaft units 220 in one direction of the freedom A, the third group of the slider keel units 21 is pulled by the second engaging portions 2200 of the corresponding shaft units 220 in the other direction of the freedom A, and reverse motion of the two groups of the slider keel units 21 within the freedom A is achieved; and additionally, the second group of the slider keel units 21 is pushed by the second engaging portions 2200 of the corresponding shaft units 220 in one direction of the freedom B, and the fourth group of the slider keel units 21 is pulled by the second engaging portions 2200 of the adjacent shaft units 220 in the other direction of the freedom B, where the reverse motion of the two groups of the slider keel units 21 within the freedom B is achieved. Every time when the rotating shaft 22 rotates by 90°, a motion direction of each group of slider keel units is switched synchronously with phase changes of the second engaging portions 2200, and finally a cross-reverse periodic pressing trajectory is formed in the directions of the freedom A and the freedom B.

The reverse motion in the directions of the freedom A (such as a longitudinal direction) and the freedom B (such as a transverse direction) is achieved simultaneously, and a massage trajectory evolves from massage in a single direction to three-dimensional cross pressing massage, which improves the muscle relaxation effect; and when an overall dimension of the massage device expands in the directions of the freedom A and the freedom B (i.e., four mutually perpendicular directions) to massage a hole-shaped massage area, a relatively strong pressing massage effect is achieved.

Figure 26:
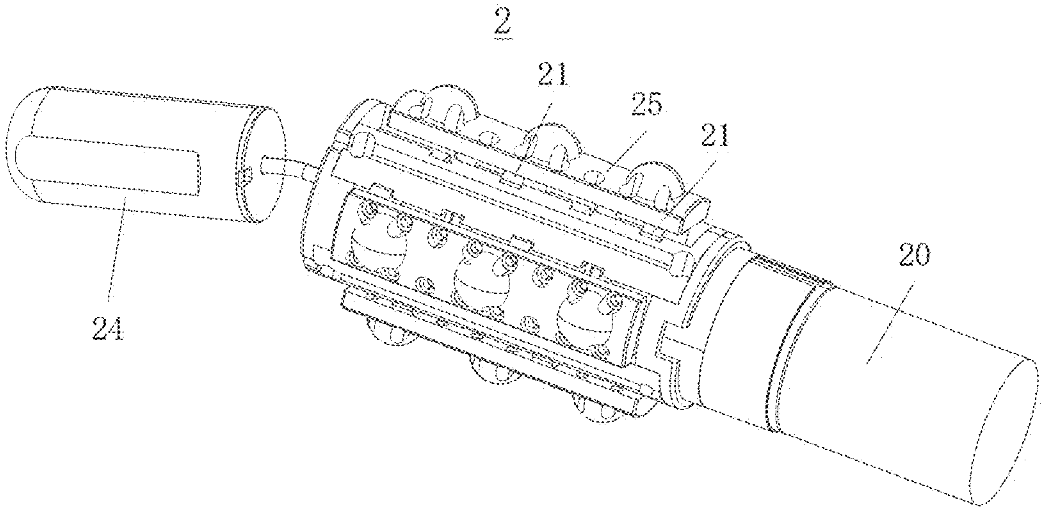
FIG. 26 is a schematic structural diagram of a massage device when supporting portions of a plurality of slider keel units are connected to a same supporting member provided in some embodiments of the present disclosure.

In a specific implementation process, as shown in FIG. 26, each group of the slider keel units 21 among the multiple groups of the slider keel units 21 includes a plurality of the slider keel units 21, the supporting portions 211 of a plurality of the slider keel units 21 in the same group are connected to the same supporting member 25, a length direction of the supporting member 25 is parallel to the axis L1, and the supporting members 25 corresponding to the multiple groups of the slider keel units 21 are circumferentially arrayed around the axis L1; the supporting member 25 has an arc surface for supporting the massage sleeve 1 to form a specified shape, and the supporting portion 211 pushes the massage sleeve 1 to deform through the supporting member 25, which prevents generation of noticeable depressions at positions between the adjacent slider keel units 21 in the same group corresponding to the massage sleeve 1 due to a large spacing between the adjacent slider keel units 21 in the same group; and a surface of the supporting member 25 facing the massage sleeve 1 is further provided with a plurality of protrusions configured to enhance the massage effect.

Figure 27:
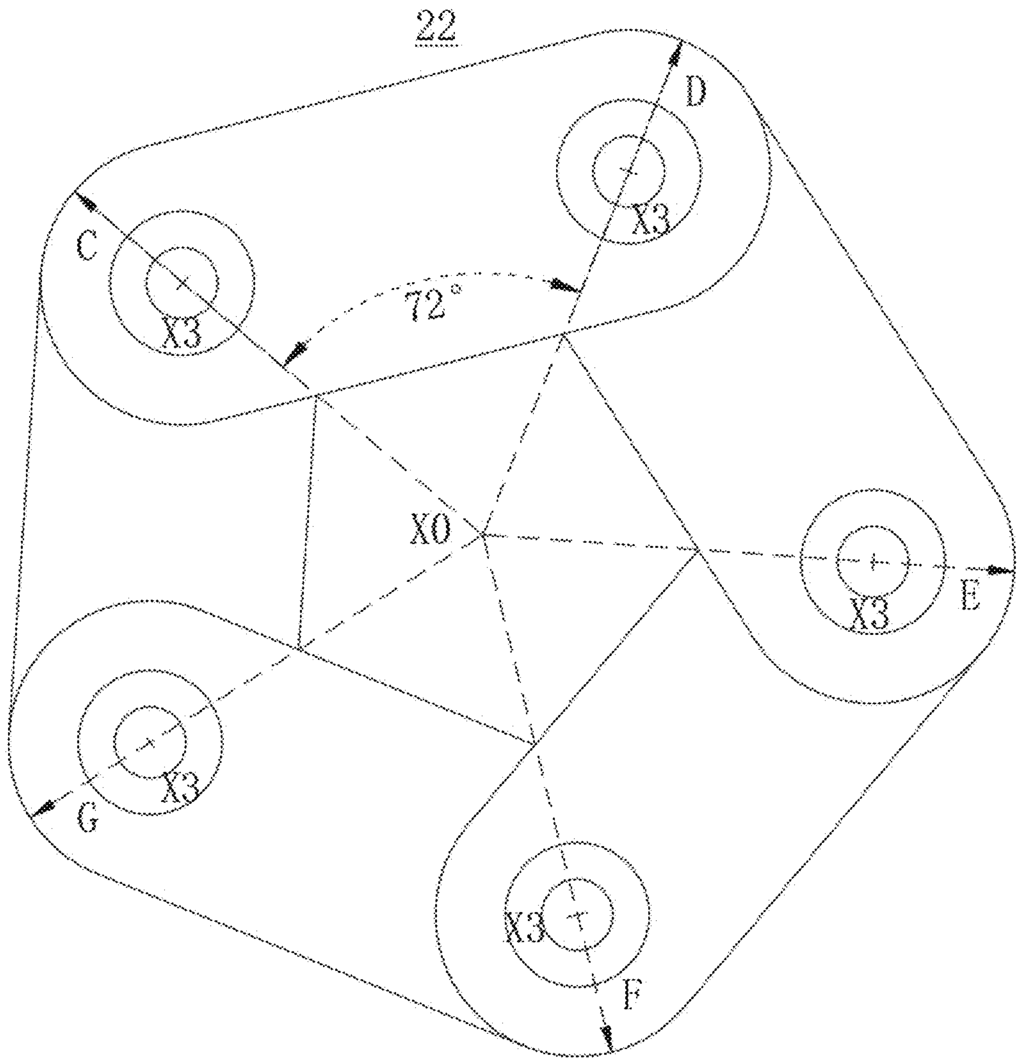
FIG. 27 is a top view of a rotating shaft when slider keel units are divided into five groups provided in some embodiments of the present disclosure.
Figure 28:
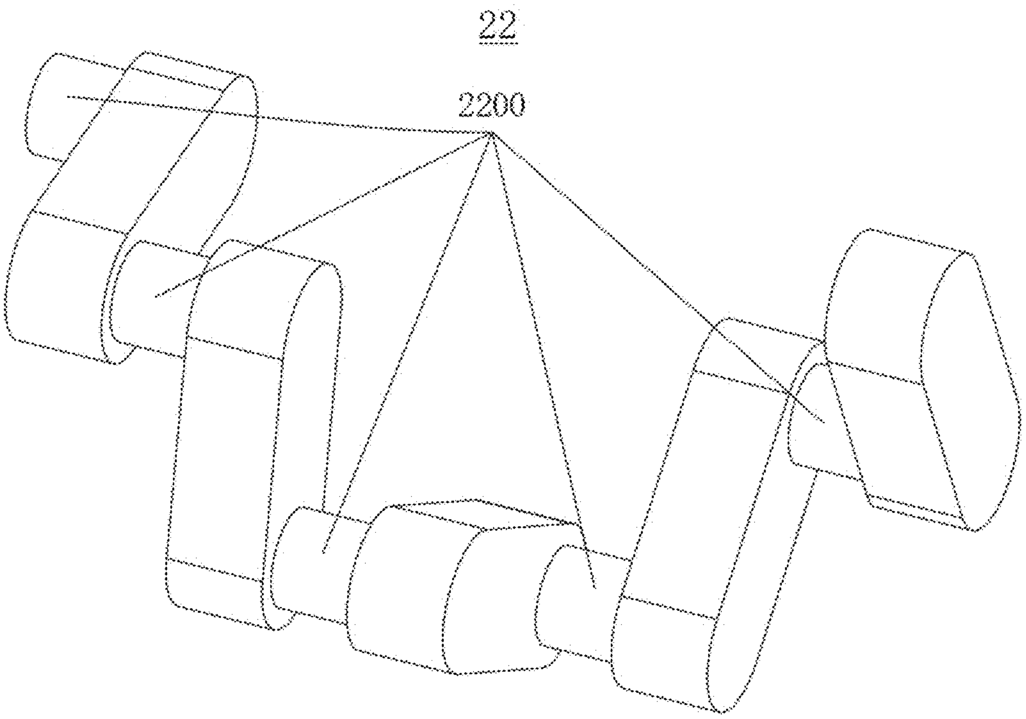
FIG. 28 is a schematic structural diagram of a rotating shaft when slider keel units are divided into five groups provided in some embodiments of the present disclosure.

According to some embodiments of the present disclosure, optionally, as shown in FIGS. 27 and 28, the slider keel units 21 are divided into five groups; motion freedom directions of the five groups of the slider keel units 21 are radially distributed in the plane perpendicular to the axis L1, and an included angle between any two freedom directions is non-zero. Projection points X3 of the second engaging portions 2200 of the shaft units 220 on a plane perpendicular to the axis L1 are all located on a same circumference with a projection point X0 of the axis L1 on the plane as a circle center; and an included angle between two lines formed by connecting projection points of the second engaging portions 2200 of the adjacent shaft units 220 with the projection point of the axis L1 is 72°, such that the five groups of the slider keel units 21 are driven by the rotating shaft 22 to perform synchronous reciprocating motions in their respective freedom directions in the plane perpendicular to the axis L1.

A plurality of shaft units 220 (consistent with the total number of the slider keel units 21) are distributed around the rotating shaft 22 of the massage device 2 along the axis L1, the slider keel units 21 are divided into five groups, and each group may include a plurality of the slider keel units 21. Motion freedom directions of the five groups of the slider keel units 21 are all perpendicular to the axis L1 and are radially and uniformly distributed in the plane perpendicular to the axis L1, and included angles between freedom directions of any two groups are non-zero and equal. A plurality of the slider keel units 21 in the same group share a same freedom direction, and the rotation constraint portions 212 of each group of the slider keel units 21 are restricted to only retain linear reciprocating motion freedoms in preset freedom directions of respective groups, and the first to fifth groups correspond to directions of freedoms C, D, E, F and G respectively.

The second engaging portion 2200 of all the shaft units 220 are located on the same circumference with the axis L1 as a circle center, and an included angle formed by connecting centers of the second engaging portions 2200 of the adjacent shaft units 220 with the axis L1 is 72°. Each of the shaft units 220 only pushes one of the slider keel units 21 correspondingly, and the slider keel units 21 in the same group are driven by the shaft units 220 spaced at a same angular interval. The five groups of the slider keel units 21 are in coupled interlock with the second engaging portions 2200 of the corresponding shaft units 220 one by one, the slider keel units 21 of the first group correspond to the shaft units 220 with a pushing direction of the freedom C, the shaft units of the second group correspond to the shaft units 220 in the direction of the freedom D, and so forth. When the drive motor 20 drives the rotating shaft 22 to rotate around the axis L1, the second engaging portions 2200 of all the shaft units 220 move synchronously around the circumference, and the included angle of 72° between the adjacent shaft units 220 causes periodic distribution of thrust directions in a radial freedom.

When the rotating shaft 22 rotates, the shaft units 220 of the first group of the slider keel units 21 are pushed to exert forces in the direction of the freedom C, and a plurality of the slider keel units 21 in the first group move synchronously in the direction of the freedom C; and additionally, the shaft units 220 of the second group are pushed to exert forces in the direction of the freedom D, and a plurality of the slider keel units 21 in the second group move synchronously in the direction of the freedom D, and the same applies to the third, fourth and fifth groups. After the rotating shaft 22 rotates by 72°, a thrust direction of the second engaging portion 2200 of each of the shaft units 220 is switched synchronously with the rotation, and a plurality of the slider keel units 21 in the same group still maintain the synchronous motion; and after rotating by 360°, all the five groups of the slider keel units 21 complete a full cycle of synchronous reciprocating motion. Through the coordinated motion of intra-group synchronization and inter-group radiation, the supporting portions 211 of all the slider keel units 21 form a dense and comprehensive radial pressing trajectory in the plane perpendicular to the axis L1.

Five freedom directions distributed radially, in combination with a plurality of the slider keel units in each group, form a composite force field of directional zoning and dense coverage, and muscles per unit area of the massage area may receive alternating forces in multiple directions and multiple contact points, which improves the effect of relieving muscle tension; and when an overall dimension of the massage device expands in the directions of five non-overlapping freedoms to massage a hole-shaped massage area, a relatively strong pressing massage effect is achieved.

The present disclosure has been described with reference to preferred embodiments, but various modifications thereto may be made without departing from the scope of the present disclosure, and equivalents may be used to replace components therein. In particular, as long as there are no structural conflicts, various technical features mentioned in all embodiments may be combined in any manner. The present disclosure is not limited to specific embodiments disclosed herein but includes all technical solutions that fall within the scope of the claims.

What is claimed is:

1. A massage device provided with a drive motor, comprising:

slider keel units, wherein each of the slider keel units is provided with a first engaging portion, a supporting portion, and a rotation constraint portion; and a rotating shaft, comprising a plurality of shaft units arranged along a rotation axis (L1) of the drive motor, wherein each of the shaft units is provided with a second engaging portion deviating from the axis (L1);

wherein the rotation constraint portion is configured to constrain each slider keel unit such that each slider keel unit only has a freedom (A) of a linear reciprocating motion, and a direction of the freedom (A) is perpendicular to the axis (L1);

the supporting portion is configured to provide external support such that the massage device presents a specified shape;

wherein the drive motor is connected to the rotating shaft and configured to drive the second engaging portion of the shaft units to perform a rotational motion around the axis (L1) with a non-zero radius; and the first engaging portion and the second engaging portion are in coupled interlock, such that a rotational motion of the second engaging portion is converted into a linear reciprocating motion of each slider keel unit along the freedom (A).

2. The massage device according to claim 1, further comprising a guide member; wherein a length direction of the guide member is parallel to the axis (L1);

the guide member is provided with a guide groove; and the rotation constraint portion is in sliding fit with the guide groove such that each slider keel unit is restricted to only have the freedom (A) of the linear reciprocating motion.

3. The massage device according to claim 2, wherein each slider keel unit has two limit positions when performing the linear reciprocating motion along the freedom (A); and one of the limit positions is located within a contour range of the guide member, and the other limit position at least partially extends beyond the contour range of the guide member.

4. The massage device according to claim 1, wherein the first engaging portion is a cylindrical hole provided with a cylindrical guiding surface;

each second engaging portion is a cylinder;

during coupling and interlocking, the cylinder moves and presses the cylindrical guiding surface, such that each slider keel unit passively performs the linear reciprocating motion within the freedom (A); or the first engaging portion is a cylinder;

the second engaging portion is a cylindrical hole provided with a cylindrical guiding surface; and during coupling and interlocking, the cylindrical guiding surface moves and presses the cylinder, such that each slider keel unit passively performs the linear reciprocating motion within the freedom (A).

5. The massage device according to claim 4, wherein the cylinder is provided with a sleeve and a shaft core; and the sleeve is movably sleeved on an outer side of the shaft core, and the sleeve comprises at least one surface area parallel to the axis (L1), such that the first engaging portion and the second engaging portion are in surface contact when coupled with each other.

6. The massage device according to claim 4, wherein each of the shaft units further comprises a connecting portion;

a length direction of the connecting portion is perpendicular to the axis (L1); and each cylinder is connected through the connecting portion, and two opposite surfaces of each slider keel unit in a direction of the axis (L1) are respectively fitted with the connecting portions for limiting.

7. The massage device according to claim 4, wherein a cross-section of the cylindrical hole is waist-shaped.

8. The massage device according to claim 4, wherein in a direction perpendicular to the freedom (A), a cross-sectional width of a central area of the cylindrical hole is smaller than a cross-sectional width of two end areas.

9. The massage device according to claim 8, wherein the cross-section of the cylindrical hole is a smoothly transitioned figure-of-eight shape.

10. The massage device according to claim 4, wherein the cross-section of the cylindrical hole is of a smoothly transitioned toothed shape.

11. The massage device according to claim 1, wherein a plurality of the slider keel units are divided into multiple groups;

wherein the multiple groups of the slider keel units are arranged along the axis (L1) in a staggered manner.

12. The massage device according to claim 11, wherein the slider keel units are divided into two groups;

projection points (X1) of the second engaging portions of the shaft units on a plane perpendicular to the axis (L1) are all located on a same circumference with a projection point (X0) of the axis (L1) on the plane as a circle center; and an included angle between two lines formed by connecting projection points of the second engaging portions of the shaft units with the projection point of the axis (L1) is 180°, such that the two groups of the slider keel units are driven by the adjacent shaft units to move in opposite directions along the freedom (A).

13. The massage device according to claim 11, wherein the supporting portion has a convex arc-shaped structure.

14. The massage device according to claim 11, wherein the slider keel units are divided into four groups;

wherein a first group of the slider keel units and a third group of the slider keel units only have the freedom (A) for the linear reciprocating motion;

a second group of the slider keel units and a fourth group of the slider keel units only have a freedom (B) perpendicular to the freedom (A) and the axis (L1);

projection points (X2) of the second engaging portions of the shaft units on a plane perpendicular to the axis (L1) are all located on a same circumference with a projection point (X0) of the axis (L1) on the plane as a circle center; and an included angle between two lines formed by connecting projection points of the second engaging portions of the shaft units with the projection point (X0) of the axis (L1) is 90°, such that the first group of the slider keel units and the third group of the slider keel units move in opposite directions within the freedom (A), and additionally, the second group of the slider keel units and the fourth group of the slider keel units move in opposite directions within the freedom (B).

15. The massage device according to claim 14, further comprising supporting members;

each group of the slider keel units comprises a plurality of the slider keel units;

a plurality of the slider keel units in the same group are connected to the same supporting member; and a surface of the supporting member away from each slider keel unit is an arc surface and is configured to provide external support, such that the massage device presents a specified shape.

16. The massage device according to claim 15, wherein the arc surface of each supporting member configured to provide external support is further provided with a plurality of protrusions configured to enhance a massage effect.

17. The massage device according to claim 11, wherein the slider keel units are divided into five groups;

motion freedom directions of the five groups of the slider keel units are radially distributed in a plane perpendicular to the axis (L1), and an included angle between any two freedom directions is non-zero;

projection points (X3) of the second engaging portions of the shaft units on the plane perpendicular to the axis (L1) are all located on a same circumference with a projection point (X0) of the axis (L1) on the plane as a circle center; and an included angle between two lines formed by connecting projection points (X3) of the second engaging portions of the shaft units with the projection point (X0) of the axis (L1) is 72°, such that the five groups of the slider keel units are driven by the rotating shaft to perform synchronous reciprocating motions in their respective freedom directions in the plane perpendicular to the axis (L1).

18. A massage wand provided with a drive motor and an elastic massage sleeve, comprising:

a plurality of slider keel units, wherein each of the slider keel units is provided with a first engaging portion, a supporting portion, and a rotation constraint portion;

a rotating shaft provided with a plurality of second engaging portions, wherein each of the second engaging portions deviates from a rotation axis (L1) of the drive motor;

wherein the rotation constraint portion is configured to constrain each slider keel unit such that each slider keel unit only has a freedom (A) of a linear reciprocating motion, and a direction of the freedom (A) is perpendicular to the axis (L1);

the drive motor is connected to the rotating shaft and configured to drive the second engaging portions to perform a rotational motion around the axis (L1) with a non-zero radius;

the first engaging portion and the second engaging portion are in coupled interlock, such that a rotational motion of the second engaging portion is converted into a linear reciprocating motion of each slider keel unit along the freedom (A);

a plurality of the slider keel units is arranged along the axis (L1), and orthographic projections of the units in a direction of the axis (L1) do not overlap with each other; and the supporting portions are configured to provide external support, and the supporting portions of the plurality of the slider keel units jointly support the massage sleeve to present a specified shape.

19. The massage wand according to claim 18, wherein further comprising a guide member, wherein a length direction of the guide member is parallel to the axis (L1);

the guide member is provided with a guide groove; and the rotation constraint portion is in sliding fit with the guide groove such that each slider keel unit is restricted to only have the freedom (A) of the linear reciprocating motion.

20. The massage wand according to claim 19, wherein each slider keel unit has two limit positions when performing the linear reciprocating motion along the freedom (A);

one of the limit positions is located within a contour range of the guide member, and the other limit position at least partially extends beyond the contour range of the guide member;

the massage sleeve is jointly supported by the guide member and the supporting portions extending out of the guide member; and when the slider keel units move to one of the limit positions where the support portions extend out of the guide member, the massage sleeve is pushed, such that this portion of the massage sleeve only undergoes unilateral deformation toward one side of the guide member.

* * * * *